US012738536B2

(12) United States Patent
Hoffert et al.

(10) Patent No.: US 12,738,536 B2
(45) Date of Patent: Sep. 15, 2026

(54) COMPOSITE SOLID-STATE BATTERY CELL

(71) Applicant: A123 Systems LLC, Novi, MI (US)

(72) Inventors: Wesley Hoffert, Maynard, MA (US); Adriana A. Rojas, Somerville, MA (US); David M. Laughman, Waltham, MA (US); Lucienne Buannic, Arlington, MA (US); Derek C. Johnson, Fort Collins, CO (US); Brian Sisk, Sudbury, MA (US)

(73) Assignee: A123 SYSTEMS LLC, Novi, MI (US)

( * ) Notice: Subject to any disclaimer, the term of this patent is extended or adjusted under 35 U.S.C. 154(b) by 1178 days.

(21) Appl. No.: 17/623,455

(22) PCT Filed: Jun. 30, 2020

(86) PCT No.: PCT/US2020/040349
§ 371 (c)(1),
(2) Date: Dec. 28, 2021

(87) PCT Pub. No.: WO2021/003184
PCT Pub. Date: Jan. 7, 2021

(65) Prior Publication Data

US 2022/0359912 A1 Nov. 10, 2022

Related U.S. Application Data

(60) Provisional application No. 62/869,405, filed on Jul. 1, 2019.

(51) Int. Cl.
*H01M 10/0565* (2010.01)
*H01M 4/02* (2006.01)
(Continued)

(52) U.S. Cl.
CPC ..... *H01M 10/0565* (2013.01); *H01M 4/0404* (2013.01); *H01M 4/602* (2013.01);
(Continued)

(58) Field of Classification Search
CPC ......... H01M 10/0565; H01M 10/0525; H01M 10/0585; H01M 10/0413; H01M 10/0436;
(Continued)

(56) References Cited

U.S. PATENT DOCUMENTS

2002/0034685 A1* 3/2002 Sato .................... H01M 50/133 429/185
2003/0013012 A1 1/2003 Ahn et al.
(Continued)

FOREIGN PATENT DOCUMENTS

WO WO2016182884 * 11/2016
WO 2016196873 A1 12/2016
(Continued)

OTHER PUBLICATIONS

International Search Report and Written Opinion of PCT/US2020/040340 filed Jun. 30, 2020.

*Primary Examiner* — Matthew W Van Oudenaren
(74) *Attorney, Agent, or Firm* — McCoy Russell LLP

(57) ABSTRACT

A coated hybrid electrode for a composite solid-state battery cell is disclosed. Systems and methods are further provided for forming an electrolyte coating including a solid ionically conductive polymer material in the coated hybrid electrode. In one example, the coated hybrid electrode can include an anode material coating, the solid polymer electrolyte coating, and a cathode material coating, such that the solid polymer electrolyte coating can function as a separator coating between the anode material coating and the cathode material coating, thus eliminating a need for a conventional battery separator. In some examples, a slurry-based coating process can be utilized for forming the solid polymer electrolyte coating. As such, the solid polymer electrolyte coating can be mechanically robust with uniform thickness. Further, a battery cell can be formed by utilizing a sub-
(Continued)

assembly stacking technique to provide battery cell stiffness and increase precision and accuracy of coating.

34 Claims, 9 Drawing Sheets

(51) Int. Cl.

| | |
|---|---|
| ***H01M 4/04*** | (2006.01) |
| ***H01M 4/60*** | (2006.01) |
| ***H01M 10/0525*** | (2010.01) |
| ***H01M 10/0585*** | (2010.01) |
| ***H01M 50/403*** | (2021.01) |
| ***H01M 50/414*** | (2021.01) |
| ***H01M 50/46*** | (2021.01) |
| ***H01M 50/497*** | (2021.01) |

(52) U.S. Cl.
CPC ... *H01M 10/0525* (2013.01); *H01M 10/0585* (2013.01); *H01M 50/403* (2021.01); *H01M 50/414* (2021.01); *H01M 50/461* (2021.01); *H01M 50/497* (2021.01); *H01M 2004/021* (2013.01); *H01M 2004/027* (2013.01); *H01M 2004/028* (2013.01); *H01M 2300/0082* (2013.01)

(58) Field of Classification Search
CPC .. H01M 10/052; H01M 4/0404; H01M 4/602; H01M 4/13; H01M 50/403; H01M 50/414; H01M 50/461; H01M 50/497; H01M 2004/021; H01M 2004/027; H01M 2004/028; H01M 2300/0082; H01M 2300/0091; H01M 2300/0094
See application file for complete search history.

(56) References Cited

U.S. PATENT DOCUMENTS

| | | | | |
|---|---|---|---|---|
| 2004/0131945 | A1* | 7/2004 | Zushi ................ | H01M 10/0587 429/231.1 |
| 2005/0058907 | A1* | 3/2005 | Kurihara ............... | H01M 4/621 252/182.1 |
| 2012/0015234 | A1* | 1/2012 | Iwaya ..................... | H01M 4/62 429/152 |
| 2012/0015251 | A1* | 1/2012 | Oki ....................... | H01M 4/505 427/126.6 |
| 2013/0260246 | A1* | 10/2013 | Chen ..................... | H01M 4/133 977/948 |
| 2017/0005356 | A1 | 1/2017 | Zimmerman | |
| 2018/0219210 | A1 | 8/2018 | Kim | |
| 2018/0261820 | A1* | 9/2018 | Liao .................... | H01M 50/497 |
| 2020/0220210 | A1* | 7/2020 | Makino ............... | H01M 10/058 |

FOREIGN PATENT DOCUMENTS

| | | | |
|---|---|---|---|
| WO | 2019065066 | A1 | 4/2019 |
| WO | WO2019065066 | * | 4/2019 |

* cited by examiner

COMPOSITE SOLID-STATE BATTERY CELL

CROSS-REFERENCE TO RELATED APPLICATIONS

This application is a U.S. national stage application under 35 U.S.C. 371 of co-pending International Application No. PCT/US2020/040349 filed on Jun. 30, 2020 which in turn claims priority to Provisional Application No. 62/869,405 filed on Jul. 1, 2019, the contents of which are incorporated herein by reference in their entirety for all purposes.

FIELD

The present description relates generally to systems and methods for a solid-state battery cell including an ionically conductive polymer material.

BACKGROUND

As the developing market for battery electric vehicles grows, so does commercial incentive for increased driving range over current technology. Translated to the battery cell level, the increased driving range may be addressed with a concomitant increase in energy density. For example, current lithium-ion, or Li-ion, cells have energy densities approaching 300 Wh/kg, with realistic development targets of 350 Wh/kg by 2023. At such energy densities, cells based on electrolytes derived from, for example, flammable organic carbonate solvents and additives may prove unsafe under thermally (e.g., "hot box"), electrochemically (e.g., overcharge), or mechanically (e.g., crush, nail penetration) abusive conditions. Replacement of such liquid electrolytes with a non-flammable solid state electrolyte presents one path to improving abuse tolerance of conventional high energy density lithium-ion cells.

Typically, battery cells for electrochemical energy storage contain four essential components: a positive electrode (cathode), a negative electrode (anode), a dielectric separator, and an electrolyte. In the case of battery cells based on conventional lithium-ion chemistry, positive and negative electrodes may be constructed with high throughput roll-to-roll techniques by applying viscous slurries that include one or more of a solvent system, active material particles, electrically conductive additive particles, and soluble and insoluble binder polymers. The slurries are coated onto metallic foils, typically using a slot-die technique, and dried using an in-line oven. A key subsequent electrode processing step includes densification, often achieved by passing coated electrodes through a narrow gap defined by hardened metallic rollers. Additional processing steps may include slitting and/or stamping depending on the final cell format. For prismatic cells, incorporation of the dielectric separator is typically achieved by interweaving a flexible porous polymeric material between a stack of alternating positive electrodes and negative electrodes in a Z-fold or stack wound configuration. The composite assembly defined by the positive electrode(s), the negative electrode(s), and the dielectric separator(s) may be subjected to tab fusion and partial encasement. Introduction of the liquid electrolyte is typically one of the final steps. Specifically, infiltration of the liquid electrolyte into the porous space contained within the composite assembly is a crucial and time-consuming step. Subsequent to initial introduction of the liquid electrolyte, a formation step takes place whereby the battery cell is subjected to a given number of charge and discharge cycles, after which evolved gases are removed by venting of the battery cell, followed by an additional step by which the battery cell is sealed for use according to specific application.

SUMMARY

Deploying a substitute for the liquid electrolyte component of conventional battery cells, described above, in the form of a solid-state equivalent provides design options not otherwise available. These options manifest in the form of flexibility of the design of the resulting battery cell's individual coatings, a device architecture derived from said coatings, as well as of a manufacturing process used therefor. Specifically, when the liquid electrolyte component of conventional battery cells is replaced by a solid-state electrolyte component comprising a powder form, additional flexibility of the coatings, the resulting device, and the manufacturing processes are realized.

The inventors have recognized the above issues and have determined solutions to at least partially address them. In particular, by incorporating solid-state electrolyte materials of a particulate nature, manufacturing routes are made available which facilitate the creation of electrode, electrolyte, or other coatings, and combinations thereof, by casting one or multiple slurries including mixtures of powders imparting parts of or the entire device with specific configurations or functionalities. The constituents of such slurries can include but are not limited to combinations of electrode active materials, solid-state electrolyte materials, electronically conducting additives, binders, and materials providing additional active or passive functionalities. Device fabrication based on the casting of multiple slurry-based coatings can be achieved using a number of techniques, further providing options tunable to a given application. Examples of such manufacturing techniques for casting of such slurries can include, but are not limited to, doctor-blade casting, tape casting, gravure printing, flexographic printing, and other roll-based printing techniques.

As detailed herein, a coated hybrid electrode is presented which provides at least some of the solutions described above. In one example, the coated hybrid electrode can include an anode current collector, an anode material coating, a solid polymer electrolyte coating, a cathode material coating, and a cathode current collector, wherein the solid polymer electrolyte coating include solid ionically conductive polymer material. In some examples, the solid polymer electrolyte coating can function as a separator coating between the anode material coating and the cathode material coating. As another example, a method for forming a cell sub-assembly can include sequentially coating an anode material coating, a solid polymer electrolyte coating, a cathode material coating, and a cathode current collector onto an anode current collector. In some examples, the sequential coating can include one or more slurry-based coating processes. As such, the coated hybrid electrode can include a solid, mechanically robust and ionically conducting dielectric coating with uniform thickness. Further, an electrochemical storage device can be formed by stacking a plurality of the cell sub-assemblies without needing to employ conventional battery separators and electrolytes, thereby, in some examples, reducing cost and improving safety relative to such conventional systems.

In one aspect, the invention features a coated hybrid electrode, comprising: an anode current collector; a cathode current collector; an anode material coating disposed on the anode current collector, the anode material coating comprising an anode active material; a cathode material coating disposed on the cathode current collector, the cathode material coating comprising a cathode active material; and a solid polymer electrolyte coating comprising a solid ionically conductive polymer material having a glassy state at room temperature and an ionic conductivity greater than $1\times10^{-5}$ S/cm at room temperature; wherein each of a first adhesion interface between the solid polymer electrolyte coating and the anode material coating and a second adhesion interface between the solid polymer electrolyte coating and the cathode material coating has a 180° peel strength of greater than 200 gf/in.

In an embodiment, the invention features the coated hybrid electrode, wherein a thickness of the solid polymer electrolyte coating is less than 100 microns.

In other embodiments, the invention features the coated hybrid electrode, wherein the solid ionically conductive polymer material is greater than 20% of a total composite volume of the solid polymer electrolyte coating.

In other embodiments, the invention features the coated hybrid electrode, wherein less than 80% of the total composite volume of the solid polymer electrolyte coating includes one or more of free volume, a binder, and one or more additives.

In other embodiments, the invention features the coated hybrid electrode, wherein a thickness of the anode material coating is greater than 30 microns.

In other embodiments, the invention features the coated hybrid electrode, wherein the anode active material is greater than 55% of a total composite volume of the anode material coating.

In other embodiments, the invention features the coated hybrid electrode, wherein the anode material coating further comprises the solid ionically conductive polymer material.

In other embodiments, the invention features the coated hybrid electrode, wherein the solid ionically conductive polymer material is less than 40% of the total composite volume of the anode material coating.

In other embodiments, the invention features the coated hybrid electrode, wherein less than 50% of the total composite volume of the anode material coating includes one or more of free volume, the binder, and the one or more additives.

In other embodiments, the invention features the coated hybrid electrode, wherein a thickness of the cathode material coating is greater than 50 microns.

In other embodiments, the invention features the coated hybrid electrode, wherein the cathode active material is greater than 55% of a total composite volume of the cathode material coating.

In other embodiments, the invention features the coated hybrid electrode, wherein the cathode material coating further comprises the solid ionically conductive polymer material.

In other embodiments, the invention features the coated hybrid electrode, wherein the solid ionically conductive polymer material is less than 20% of the total composite volume of the cathode material coating.

In other embodiments, the invention features the coated hybrid electrode, wherein less than 50% of the total composite volume of the cathode material coating includes one or more of free volume, the binder, and the one or more additives.

In other embodiments, the invention features the coated hybrid electrode, further comprising: an anode electrolyte transition coating disposed between the anode material coating and the solid polymer electrolyte coating, the anode electrolyte transition coating comprising the anode active material and the solid ionically conductive polymer material.

In other embodiments, the invention features the coated hybrid electrode, wherein a thickness of the anode electrolyte transition coating is less than 20 microns.

In other embodiments, the invention features the coated hybrid electrode, wherein the anode active material is greater than 30% of a total composite volume of the anode electrolyte transition coating.

In other embodiments, the invention features the coated hybrid electrode, wherein the solid ionically conductive polymer material is less than 50% of the total composite volume of the anode electrolyte transition coating.

In other embodiments, the invention features the coated hybrid electrode, wherein less than 50% of the total composite volume of the anode electrolyte transition coating includes one or more of free volume, the binder, and the one or more additives.

In other embodiments, the invention features the coated hybrid electrode, wherein further comprising: a cathode electrolyte transition coating disposed between the cathode material coating and the solid polymer electrolyte coating, the cathode electrolyte transition coating comprising the cathode active material and the solid ionically conductive polymer material.

In other embodiments, the invention features the coated hybrid electrode, wherein a thickness of the cathode electrolyte transition coating is less than 20 microns.

The coated hybrid electrode of any one of the preceding claims, wherein the cathode active material is greater than 30% of a total composite volume of the cathode electrolyte transition coating.

In other embodiments, the invention features the coated hybrid electrode, wherein the solid ionically conductive polymer material is less than 50% of the total composite volume of the cathode electrolyte transition coating.

In other embodiments, the invention features the coated hybrid electrode, wherein less than 50% of the total composite volume of the cathode electrolyte transition coating includes one or more of free volume, the binder, and the one or more additives.

In other embodiments, the invention features the coated hybrid electrode, wherein a volume fraction of the solid ionically conductive polymer material in the anode electrolyte transition coating is greater than in the anode material coating.

In other embodiments, the invention features the coated hybrid electrode, wherein a volume fraction of the solid ionically conductive polymer material in the cathode electrolyte transition coating is greater than in the cathode material coating.

In other embodiments, the invention features the coated hybrid electrode, wherein a volume fraction of the solid ionically conductive polymer material in the anode electrolyte transition coating is less than in the solid polymer electrolyte coating.

In other embodiments, the invention features the coated hybrid electrode, wherein a volume fraction of the solid ionically conductive polymer material in the cathode electrolyte transition coating is less than in the solid polymer electrolyte coating.

In other embodiments, the invention features the coated hybrid electrode, wherein each of the anode current collector and the cathode current collector is respectively included in a double-coated structure.

In other embodiments, the invention features the coated hybrid electrode, wherein the first adhesion interface extends into the anode material coating by a permeation length fraction of less than 50%; and the second adhesion interface extends into the cathode material coating by a permeation length fraction of less than 50%.

In other embodiments, the invention features the coated hybrid electrode, wherein a reversible specific gravimetric capacity of the anode active material is greater than 150 mAh/g.

In other embodiments, the invention features the coated hybrid electrode, wherein a reversible specific gravimetric capacity of the cathode active material is greater than 130 mAh/g.

In other embodiments, the invention features the coated hybrid electrode, wherein a density of the solid ionically conductive material is greater than 1.2 $g/cm^3$ and less than 1.6 $g/cm^3$.

In other embodiments, the invention features the coated hybrid electrode, wherein particles of the solid ionically conductive polymer material have one or more of spherical, ellipsoid, needle-like, and disk-like morphology.

In another aspect, the invention features a battery cell, comprising: a plurality of battery cell sub-assemblies, the battery cell sub-assemblies comprising: an anode current collector having an anode material coating disposed thereon, the anode material coating comprising an anode active material; a cathode current collector having a cathode material coating disposed thereon, the cathode material coating comprising a cathode active material; and a solid polymer electrolyte coating in the form of a separator, the solid polymer electrolyte coating comprising a solid ionically conductive polymer material having a glassy state at room temperature and an ionic conductivity greater than $1\times10^{-5}$ S/cm at room temperature; wherein each of a first adhesion interface between the solid polymer electrolyte coating and the anode material coating and a second adhesion interface between the solid polymer electrolyte coating and the cathode material coating has a 180° peel strength of greater than 200 gf/in.

In an embodiment, the invention features the battery cell, wherein the anode material coating further comprises the solid ionically conductive polymer material.

In other embodiments, the invention features the battery cell, wherein the cathode material coating further comprises the solid ionically conductive polymer material.

In other embodiments, the invention features the battery cell, further comprising: an anode electrolyte transition coating disposed between the anode material coating and the solid polymer electrolyte coating, where the anode electrolyte transition coating comprises the anode active material and the solid ionically conductive polymer material.

In other embodiments, the invention features the battery cell, further comprising: a cathode electrolyte transition coating disposed between the cathode material coating and the solid polymer electrolyte coating; where the cathode electrolyte transition coating comprises the cathode active material and the solid ionically conductive polymer material.

In other embodiments, the invention features the battery cell, wherein each of the anode current collector and the cathode current collector is respectively included in a double-coated structure.

In other embodiments, the invention features the battery cell, wherein the first adhesion interface extends to a permeation length fraction of 25% into the anode material coating; and the second adhesion interface extends to a permeation length fraction of 25% into the cathode material coating.

In other embodiments, the invention features the battery cell, wherein a density of the solid ionically conductive material is greater than 1.2 $g/cm^3$ and less than 1.6 $g/cm^3$.

In other embodiments, the invention features the battery cell, wherein a particle distribution of the solid ionically conductive polymer material in one or more of the anode material coating, the cathode material coating, the solid polymer electrolyte coating, the anode electrolyte transition coating, and the cathode electrolyte transition coating provides a continuous percolation network between particles of the cathode active material and the anode active material.

In other embodiments, the invention features the battery cell, comprising: the plurality of battery subassemblies having a sequentially coated configuration where the anode material coating, the solid polymer electrolyte coating, the cathode material coating, and the cathode current collector are formed onto the anode current collector.

In other embodiments, the invention features the battery cell, comprising: the plurality of battery subassemblies having a sequentially coated configuration where the anode material coating, the anode electrolyte transition coating, the solid polymer electrolyte coating, the cathode material coating, and the cathode current collector are formed onto the anode current collector.

In other embodiments, the invention features the battery cell, comprising: the plurality of battery subassemblies having a sequentially coated configuration where the anode material coating, the solid polymer electrolyte coating, the cathode electrolyte transition coating, the cathode material coating, and the cathode current collector are formed onto the anode current collector.

In other embodiments, the invention features the battery cell, comprising: the plurality of battery subassemblies having a sequentially coated configuration where the anode material coating, the anode electrolyte transition coating, the solid polymer electrolyte coating, the cathode electrolyte transition coating, the cathode material coating, and the cathode current collector are formed onto the anode current collector.

In other embodiments, the invention features the battery cell, comprising: a stacked configuration of the plurality of battery cell assemblies.

In other embodiments, the invention features the battery cell, comprising: a battery separator bifurcating the solid polymer electrolyte coating.

In another aspect, the invention features a method for forming a coating on an electrode structure, comprising: forming a slurry comprising a solid ionically conductive polymer material wherein the solid ionically conductive polymer material has a glassy state at room temperature and an ionic conductivity greater than $1\times10^{-5}$ S/cm at room temperature; coating the slurry onto the electrode structure; drying the coated electrode structure; and calendaring the coated electrode structure; wherein the electrode structure comprises one of an anode material coating deposited on an anode current collector and a cathode material coating deposited on a cathode current collector; and an adhesion interface between the coating and the electrode structure has a 180° peel strength of greater than 200 gf/in.

In an embodiment, the invention features the method, wherein a density of the solid ionically conductive material is greater than 1.2 $g/cm^3$ and less than 1.6 $g/cm^3$.

In other embodiments, the invention features the method, wherein the slurry further comprises one of an anode active material and a cathode active material.

In other embodiments, the invention features the method, wherein the coating is one of slot-die coating, roll-to-roll coating, spray coating, and reverse comma coating.

In other embodiments, the invention features the method, wherein the coating is one of doctor-blade casting, tape casting, gravure printing, and flexographic printing.

In other embodiments, the invention features the method, wherein the coating is one of a solid polymer electrolyte coating, an anode electrolyte transition coating, and a cathode electrolyte transition coating.

In other embodiments, the invention features the method further comprising: forming the coating between the anode material coating and the cathode material coating.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a solid-state battery cell including an ionically conductive polymer material as an electrolyte. Specifically, the ionically conductive polymer material can be a solid ionically conducting powder, such as the solid, ionically conductive polymer material of U.S. Patent Application Publication No. 2017/0018781 (attached herein as Attachment A), International Publication No. WO 2016/196873 (attached herein Attachment B), and U.S. Patent Application Publication No. 2017/0005356 (attached herein as Attachment C), the contents of which are incorporated herein by reference, and such as the solid ionically conducting powder produced by Ionic Materials Inc. of Woburn, Massachusetts. The solid ionically conductive polymer material can be synthesized from: a polymer, a dopant and an ionic compound. The base polymer can be semicrystalline or fully crystalline. Typical materials that can be used for the base polymer include liquid crystal polymers and polyphenylene sulfide, also known as PPS, or a semicrystalline polymer with a crystallinity index greater than 30%, and preferably greater than 50%. The solid ionically conducting material can be a thermoplastic. The solid ionically conducting material is conductive in the glassy state. The dopant is an electron acceptor, and can be DDQ, TCNE, chloranil, oxygen, ozone and sulfur trioxide ($SO_3$). The ion source or "ionic compounds" can include salts typically used in lithium ion batteries or other battery systems, such as LiTFSI (lithium bis-trifluoromethanesulfonimide), LiFSI (lithium bis(fluorosulfonyl)imide), lithium bis(oxalato)borate ($LiB(C_2O_4)_2$, "LiBOB") and other lithium ionic compounds and combinations thereof. Specifically, the solid ionically conductive polymer material has an ionic conductivity greater than $1\times10^{-5}$ S/cm at room temperature and a glassy state at room temperature, wherein room temperature is defined as 20 to 25° C. for purposes of the present application. As such, the ionically conductive polymer material has a high room-temperature ionic conductivity that is, a high ionic conductivity at room temperature, and can be incorporated into various coatings of the solid-state battery cell for electrochemical stability in a tunable and electrode-specific manner. Further, the ionically conductive polymer material can retain a form of a solid powder which can be insoluble in typically employed solvents. The ionically conductive polymer material can therefore provide tuning/reduction of interfacial impedance by varying a particle size distribution, particle morphologies, relative volume percentages, etc.

Figure 1A:
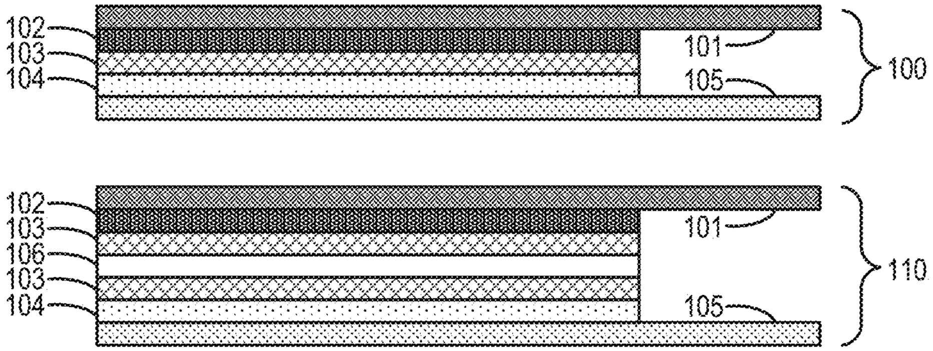
FIG. 1A shows schematic structural diagrams of first and second example configurations of a battery cell sub-assembly.
Figure 1B:
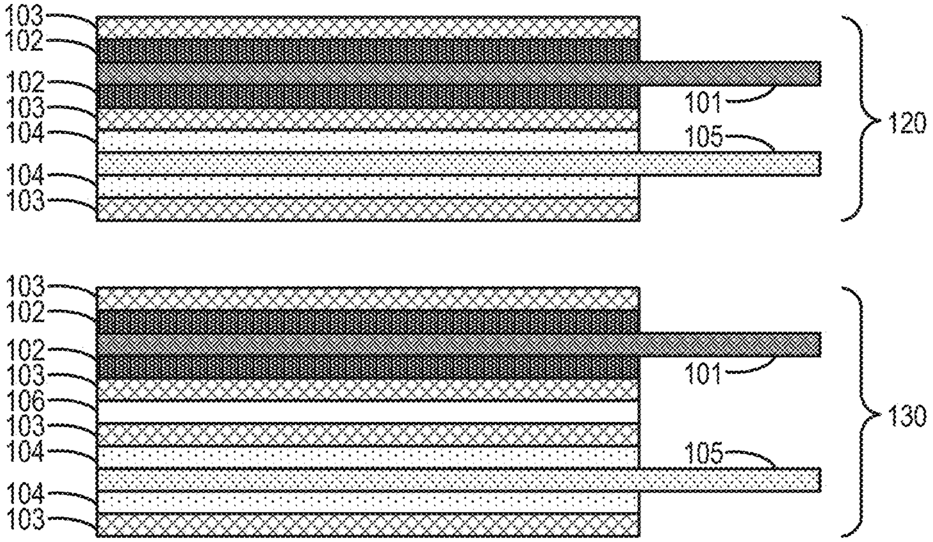
FIG. 1B shows schematic structural diagrams of third and fourth example configurations of the battery cell sub-assembly.
Figure 1C:
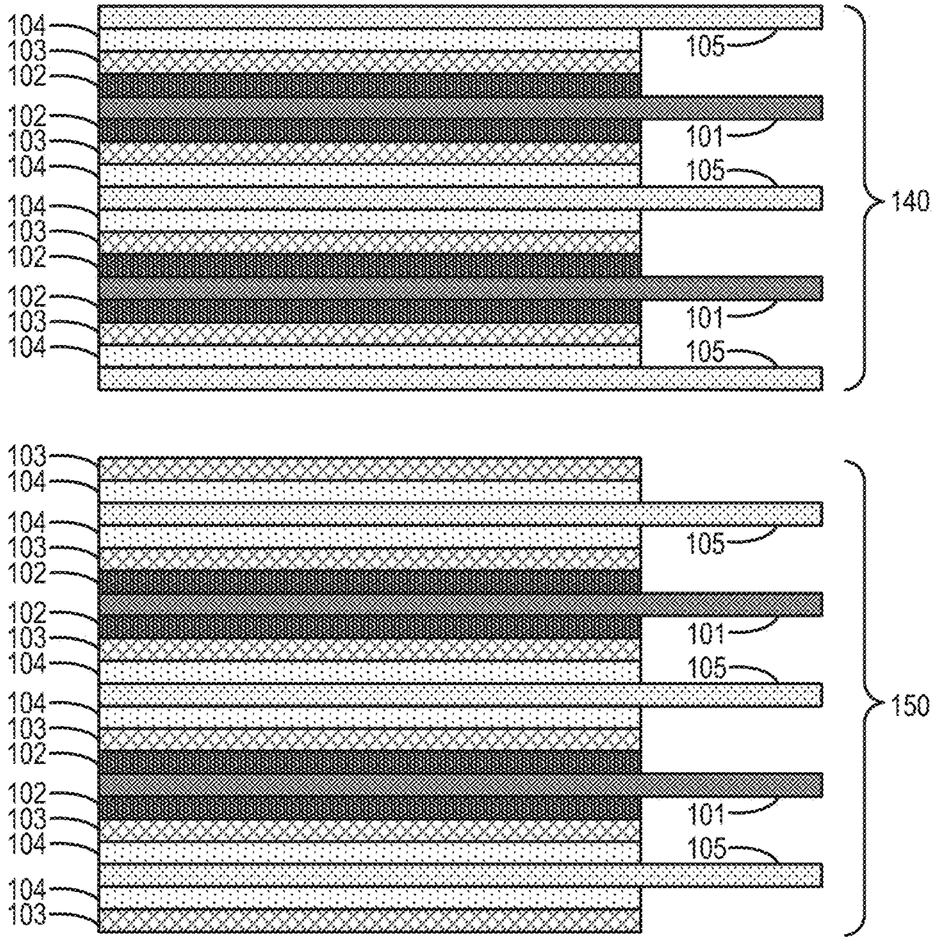
FIG. 1C shows schematic structural diagrams of fifth and sixth example configurations of the battery cell sub-assembly.
Figure 2:
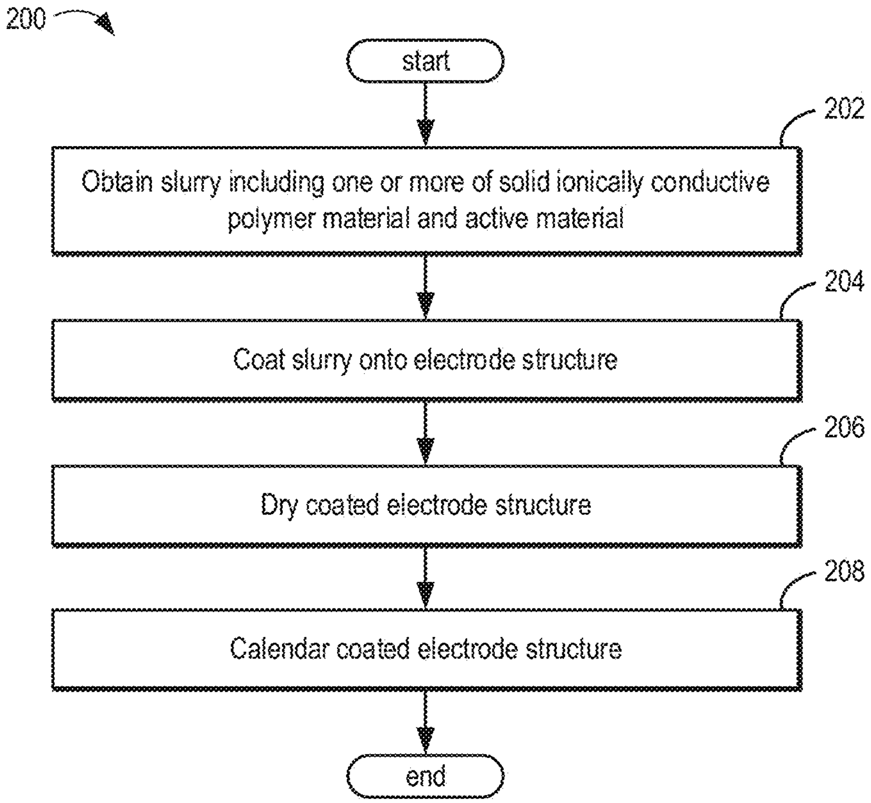
FIG. 2 shows a method for forming a coating on an electrode structure via a slurry-based coating process.

FIGS. 1A-1C depict various configurations of a battery cell sub-assembly, or coated hybrid electrode. FIG. 2 depicts a method for forming a coating on an electrode structure (e.g., a cathode material coating, an anode material coating, a cathode current collector, an anode current collector, or a combination thereof) via a slurry-based coating process. FIGS. 3-6 depict various schematic methods for forming the battery cell sub-assembly via sequential coating processes. FIGS. 7A and 7B depict cross-sections of an example electrode, showing adhesion interfaces therein.

Referring now to FIG. 1A, a first configuration 100 and a second configuration 110 of the battery cell sub-assembly, or coated hybrid electrode, are depicted. Sequentially, the first configuration 100 of the battery cell sub-assembly can include an anode current collector 101, an anode material coating 102, a solid polymer electrolyte coating 103, a cathode material coating 104, and a cathode current collector 105. As such, the solid polymer electrolyte coating 103 can function as a battery separator.

The second configuration 110 can further include a conventional battery separator 106 disposed between two solid polymer electrolyte coatings 103, the two solid polymer electrolyte coatings 103 disposed adjacent to the anode material coating 102 and the cathode material coating 104, respectively. In some examples, the conventional battery separator 106 can bifurcate a single solid polymer electrolyte coating 103.

The anode material coating 102 can include an anode active material which contains lithium. The cathode material coating 104 can include a cathode active material which contains lithium. The solid polymer electrolyte coating 103 can include the ionically conductive polymer material, as described hereinabove.

In some examples, a transition coating can be provided between the solid polymer electrolyte coating 103 and one or more of the anode material coating 102 and the cathode material coating 104 to reduce interfacial impedance therebetween. In some examples, an anode electrolyte transition coating, such as the anode electrolyte transition coating described below with reference to FIG. 4, can be disposed between the solid polymer electrolyte coating 103 and the anode material coating 102. The anode electrolyte transition coating can include the anode active material and the solid ionically conductive polymer material. In some examples, a cathode electrolyte transition coating, such as the cathode electrolyte transition coating described below with reference to FIG. 5, can be disposed between the solid polymer electrolyte coating 103 and the cathode material coating 104. The cathode electrolyte transition coating can include the cathode active material and the solid ionically conductive polymer material.

In some examples, the ionically conductive polymer material can be incorporated directly into an active material coating, such as the anode material coating 102 or the cathode material coating 104, or an energy storage coating. As such, the ionically conductive polymer material can be distributed throughout the battery cell sub-assembly in a configuration dependent upon specific application.

In alternative examples, a thickness of the solid polymer electrolyte coating 103 can be less than 100 microns, ≤50 microns, ≤40 microns, ≤30 microns, ≤20 microns, or ≤15 microns.

A total composite volume ($volume_{total}$) of the solid polymer electrolyte coating 103 can be defined as $volume_{total}$=% $volume_{Component\ A}$+% $volume_{Component\ B}$+% $volume_{Component\ C}$, where % $volume_{component\ A}$ corresponds to a percent volume of the solid ionically conductive polymer material, % $volume_{Component\ B}$ corresponds to a percent free volume, and % $volume_{Component\ C}$ corresponds to a percent volume arising from a binder, one or more additives, and/or any other functional and non-functional components. In alternative examples, % $volume_{Component\ A}$ can be >5%, >10%, >15%, >20%, >25%, >30%, or >35%. In alternative examples, % $volume_{Component\ B}$ can be <80%, <85%, <90%, or <95%. In alternative examples % $volume_{Component\ C}$ can be <20%, <15%, <10%, or <5%. In alternative examples, % $volume_{Component\ B}$+% $volume_{Component\ C}$ can be <30% <20%, <15%, <10%, or <5%.

In alternative examples, particles of the solid ionically conductive polymer material included in the solid polymer electrolyte coating 103 can have an electrochemical stability window (z) vs. the $Li^{+/0}$ electrochemical redox couple of 0.5 V≤z≤4 V, 0.25 V≤z≤4 V, or 0.5 V≤z≤4.5 V. Stability can be defined by a specific irreversible capacity at an electrochemical potential (e.g., z) of <50 mAh/g, <25 mAh/g, <10 mAh/g, or 5 mAh/g in alternative examples.

A particle distribution of the solid ionically conductive polymer material can be provided in the solid polymer electrolyte coating 103 in such a manner as to provide a continuous percolation network, enabling solid-state ion transfer between basal planes of the solid polymer electrolyte coating 103 and between particles of the active materials (such as the cathode active material or the anode active material of, e.g., the cathode material coating 104 and the anode material coating 102, respectively).

The particle distribution of the solid ionically conductive polymer material can be distributed within the solid polymer electrolyte coating 103 in such a manner as to enable ion transfer pathways with minimum tortuosity. In such a case, tortuosity ($\tau$) can be defined by $\tau=L'/L$ where L' is the average ion transfer path length and L is the thickness of the solid polymer electrolyte coating 103.

The particles of the ionically conductive solid-state polymer material included in the solid polymer electrolyte coating 103 can have one or more of a spherical, ellipsoid, needle-like, and disk-like morphology.

In examples wherein the solid polymer electrolyte coating 103 interfaces with the anode material coating 102, the particles of the ionically conductive solid-state polymer material included therein can have high malleability, defined by a yield strength, such that particle-particle collisions between soft, low-density carbon- or silicon-based anode active material particles and additional soft polymer particles during dry or wet mixing coating formation processes can result in plastic deformation of the polymer particles.

In examples wherein the solid polymer electrolyte coating 103 interfaces with the cathode material coating 104, the particles of the ionically conductive solid-state polymer material included therein can have medium malleability, defined by the yield strength, such that particle-particle collisions between hard ceramic cathode active material particles and additional soft polymer particles during dry or wet mixing processes can result in plastic deformation of the polymer particles.

The cathode material coating 104 can include a coating disposed between the cathode electrolyte transition coating, as described below with reference to FIG. 5, and the cathode current collector 105 whereby a volume fraction of the cathode active material can be greater than that of the cathode electrolyte transition coating and a volume fraction of the solid ionically conductive polymer material can be less than that of each of the cathode electrolyte transition coating and the solid polymer electrolyte coating 103.

In alternative examples, a thickness of the cathode material coating 104 can be greater than 50 microns, 100 microns, or 150 microns.

A total composite volume ($volume_{total}$) of the cathode material coating 104 can be defined as $volume_{total}$=% $volume_{Component\ A}$+% $volume_{Component\ B}$+% $volume_{Component\ C}$+% $volume_{Component\ D}$, where % $volume_{Component\ A}$ corresponds to a percent volume of the cathode active material, % $volume_{Component\ B}$ corresponds to a percent volume of the solid ionically conductive polymer material, % $volume_{Component\ C}$ corresponds to a percent free volume, and % $volume_{Component\ D}$ corresponds to a percent volume arising from a binder, one or more additives, and/or any other functional and non-functional components. In alternative examples, % $volume_{Component\ A}$ can be >40%, >50%, >55%, >60%, >65%, or >70%. In alternative examples, % $volume_{Component\ B}$ can be <45%, <30%, <25%, <20%, or <15%. In alternative examples % $volume_{Component\ C}$ can be <50%, <40%, <30%, <20%, <15%, <10%, or <5%. In some alternative % $volume_{Component\ D}$ can be <30%, <25%, <10%, or <5%. In some examples, % $volume_{Component\ C}$+% $volume_{Component\ D}$ can be <30%, <20%, <15%, <10%, or <5%.

In some examples, a reversible specific gravimetric capacity of the cathode active material included in the cathode material coating 104 can be >130 mAh/g, >150 mAh/g, >175 mAh/g, or >200 mAh/g.

In alternative examples, particles of the solid ionically conductive polymer material included in the cathode active material coating 104 can have an electrochemical stability window (z) vs. the $Li^{+/0}$ electrochemical redox couple of 2 V≤z≤5 V, 2.5 V≤z≤5 V, or 2.5V≤z≤5.5 V. Stability can be defined by a specific irreversible capacity at an electrochemical potential (e.g., z) of <50 mAh/g, <25 mAh/g, <10 mAh/g, or <5 mAh/g in alternative examples.

A particle distribution of the solid ionically conductive polymer material can be provided in the cathode material coating 104 in such a manner as to provide a continuous percolation network, enabling solid-state ion transfer between basal planes of the cathode material coating 104 and between particles of the cathode active material.

The particle distribution of the solid ionically conductive polymer material can be distributed within the cathode material coating 104 in such a manner as to enable ion transfer pathways with minimum tortuosity. In such a case, tortuosity ($\tau$) can be defined by $\tau = L'/L$ where L' is the average ion transfer path length and L is the thickness of the cathode material coating 104.

The particles of the ionically conductive solid-state polymer material included in the cathode material coating 104 can have one or more of a spherical, ellipsoid, needle-like, and disk-like morphology.

The particles of the ionically conductive solid-state polymer material included in the cathode material coating 104 can have medium malleability, defined by the yield strength, such that particle-particle collisions between hard ceramic cathode active material particles and additional soft polymer particles during dry or wet mixing processes can result in plastic deformation of the polymer particles.

The anode material coating 102 can include a coating disposed between the anode electrolyte transition coating, as described below with reference to FIG. 4, and the anode current collector 101 whereby a volume fraction of the anode active material can be greater than that of the anode electrolyte transition coating and a volume fraction of the solid ionically conductive polymer material can be less than that of each of the anode electrolyte transition coating and the solid polymer electrolyte coating 103.

In alternative examples, a thickness of the anode material coating 102 can be greater than 10 microns, 20 microns, 30 microns, 50 microns, 75 microns, 100 microns, or 150 microns.

A total composite volume ($volume_{total}$) of the anode material coating 102 can be defined as $volume_{total} = \%\ volume_{Component\ A} + \%\ volume_{Component\ B} + \%\ volume_{Component\ C} + \%\ volume_{Component\ D}$, where $\%\ volume_{Component\ A}$ corresponds to a percent volume of the anode active material, $\%\ volume_{Component\ B}$ corresponds to a percent volume of the solid ionically conductive polymer material, $\%\ volume_{Component\ C}$ corresponds to a percent free volume, and $\%\ volume_{Component\ D}$ corresponds to a percent volume arising from a binder, one or more additives, and/or any other functional and non-functional components. In alternative examples, $\%\ volume_{Component\ A}$ can be >40%, >50%, >55%, >60%, >65%, or >70%. In alternative examples, $\%\ volume_{Component\ A}$ can be <40%, <30%, <25%, <20%, or <15%. In alternative examples $\%\ volume_{Component\ C}$ can be <50%, <40%, <30%, <20%, <15%, <10%, or <5%. In alternative examples $\%\ volume_{Component\ D}$ can be <30%, <25%, <10%, or <5%. In alternative examples, $\%\ volume_{Component\ C} + \%\ volume_{Component\ D}$ can be <30%, <20%, <15%, <10%, or <5%.

In alternative examples, a reversible specific gravimetric capacity of the anode active material included in the anode material coating 102 can be >150 mAh/g, >300 mAh/g, >600 mAh/g, or >1000 mAh/g.

In alternative examples, particles of the solid ionically conductive polymer material included in the anode material coating 102 can have an electrochemical stability window (z) vs. the $Li^{+/0}$ electrochemical redox couple of 0.0 V≤z≤2 V, 0.25 V≤z≤2 V, or 0.5 V≤z≤2 V. Stability can be defined by a specific irreversible capacity at an electrochemical potential (e.g., z) of <50 mAh/g, <25 mAh/g, <10 mAh/g, or <5 mAh/g in alternative examples.

A particle distribution of the solid ionically conductive polymer material can be provided in the anode material coating 102 in such a manner as to provide a continuous percolation network, enabling solid-state ion transfer between basal planes of the anode material coating 102 and between particles of the anode active material.

The particle distribution of the solid ionically conductive polymer material can be distributed within the anode material coating 102 in such a manner as to enable ion transfer pathways with minimum tortuosity. In such a case, tortuosity ($\tau$) can be defined by $\tau = L'/L$ where L' is the average ion transfer path length and L is the thickness of the anode material coating 102.

The particles of the ionically conductive solid-state polymer material included in the anode material coating 102 can have one or more of a spherical, ellipsoid, needle-like, and disk-like morphology.

The particles of the ionically conductive solid-state polymer material included in the anode material coating 102 can have high malleability, defined by a yield strength, such that particle-particle collisions between soft, low-density carbon- or silicon-based anode active material particles and additional soft polymer particles during dry or wet mixing coating formation processes can result in plastic deformation of the polymer particles.

The various coatings described above can be produced using roll-to-roll manufacturing techniques. Aspects, properties, qualities and/or features of a given coating can be varied by adjusting a slurry comprising a mixture of powders, as well parameters used to execute a deposition of the slurry forming said coating. Most, if not all, properties of a given coating can be continuously varied during slurry manufacture or coating deposition, providing tunable parameters which are highly aligned with the needs of a given application.

By varying the parameters of the slurry and the method by which the coating is deposited, a wide variety of properties of a given coating which can be tuned can include, but are not limited to, a density, a roughness, a solid content, an inter-particle distribution, and/or a composition of said coating. Consequent properties which can be varied as a function of the above parameters include an electrical resistance, ionic conductivity, electrochemical capacity, chemical stability, thermal stability, mechanical durability, electrochemical stability, etc.

A combination of multiple powder-based coatings manufactured using techniques involving casting of one slurry onto a previously deposited slurry-cast coating facilitates an optimizable combination of said coatings to realize improved functionality. As an example, a formulation of a given coating as defined by mass or volume fractions of powder constituents, can be varied from one coating to another such that properties of an interfacial coating provide for optimized combination of two coatings adjacent to said interfacial coating. Two examples of such properties which can utilize such a strategy include interfacial coating resistance and mechanical strength of an interfacial coating, each of which can be improved by optimal selection of relative fractions and particle sizes of constituent powders of said interfacial coating.

Furthermore, use of roll-to-roll deposition methods which leverage desirable coating properties provided via casting of structures including multiple coatings can allow for introduction/elimination of individual coatings from a given composite structure to achieve device characteristics suited for particular applications. As an example, in applications where factors such as mechanical stability or safety characteristics vastly outweigh performance metrics, such as peak power, said desired coating characteristics can be provided with an introduction of multiple separator coatings of increased thickness or specialized composition between electrodes therein. Specifically, such separator coatings can impart greater device stability during service and in the event of catastrophic failure. By contrast, in applications or a case where power output is of critical importance, various coatings can be preferably designed with minimal resistance, realized by a reduction of coating thickness and an increased prevalence of components responsible for charge conduction at the expense of electrode active materials. Such design choices can be immediately accessed by continuously variable processes intrinsic to the roll-to-roll deposition methods with which devices derived from slurries can be manufactured.

The various configurations and embodiments described herein illustrate products of the above-described methodologies. With ease of coating addition/subtraction, functionality and ease and cost of manufacturing can be improved relative to analogous methodologies in the art. As a further example, the particle size distribution of the solid ionically conductive polymer material in the embodiments described herein can be varied in the various coatings (e.g., the anode material coating 104, the solid polymer electrolyte coating 103, the cathode material coating 104, the anode electrolyte transition coating, the cathode electrolyte transition coating, etc.) to optimize inter-particle percolation networks specific to and between each coating. Where regions of the battery cell not requiring such fine-tuning arise, such steps can be eliminated to further improve cost savings. Such design choices can be implemented as necessary in response to fundamental inputs such as changes in raw materials or requirements of a specific application. Furthermore, each of the configurations and embodiments described herein can remove or delete manufacturing steps associated with the introduction of a liquid electrolyte and/or an associated separator coating, including steps which can require different manufacturing processes than the manufacturing processes of the various coatings.

By combining each of a dielectric and an ion-conducting functionality of the separator with an energy storage functionality of an electrode material coating (e.g., the anode material coating 102 or the cathode material coating 104) into a single monolithic battery cell sub-assembly, advanced cell manufacturing processes become available. Examples can include, but are not limited to, stamped electrode and monolithic electrode-electrolyte sub-assemblies with minimal negative electrode overhang (allowing cell design with maximum geometric utilization, leading to higher gravimetric and volumetric energy densities), and stacking electrode and electrode-electrolyte sub-assemblies without a requirement to interweave a secondary dielectric separator between electrodes, leading to reduced line speeds.

Referring now to FIG. 1B, a third configuration 120 and a fourth configuration 130 of the battery cell sub-assembly, or coated hybrid electrode, are depicted. The third configuration 120 of the battery cell sub-assembly can include a double-coated electrode structure. That is, the anode current collector 101 can have two anode material coatings 102 respectively disposed on each stacked side of the anode current collector 101, and the cathode current collector 105 can have two cathode material coatings 104 respectively disposed on each stacked side of the cathode current collector 105. Further, three solid polymer electrolyte coatings 103 can be included therein, respectively functioning as an upper outer surface, a separator, and a lower outer surface of the battery cell sub-assembly.

The fourth configuration 130 can further include a conventional battery separator 106 disposed between two of the solid polymer electrolyte coatings 103, the two of the solid polymer electrolyte coatings 103 disposed adjacent to one of the anode material coatings 102 and one of the cathode material coatings 104, respectively. In some examples, the conventional battery separator 106 can bifurcate a single solid polymer electrolyte coating 103.

Referring now to FIG. 1C, a fifth configuration 140 and a sixth configuration 150 of the battery cell sub-assembly, or coated hybrid electrode, are depicted. The fifth configuration 140 of the battery cell sub-assembly can include a stacked electrode structure, wherein each of the solid electrolyte coatings 103 are disposed respectively between one of the anode material coatings 102 and one of the cathode material coatings 104. Two inner anode current collectors 102 and one inner cathode current collector 105 included therein can exhibit the double-coated electrode structure described hereinabove with reference to FIG. 1B. Two outer cathode current collectors 105 included therein can respectively function as the upper outer surface and the lower outer surface of the battery cell sub-assembly.

The sixth configuration 150 can include the stacked electrode structure, wherein each of the anode current collectors 102 and the cathode current collectors 105 included therein can exhibit the double-coating electrode structure described hereinabove with reference to FIG. 1B. In such a configuration, each of the anode current collectors 101 can have two anode material coatings 102 disposed respectively on each stacked side of each of the anode current collectors 101 and each of the cathode current collectors 105 can have two cathode material coatings 104 disposed respectively on each stacked side of each of the cathode current collectors 105. As in the fifth configuration 140, solid electrolyte coatings 103 can be respectively disposed between one of the anode material coatings 102 and one of the cathode material coatings 104. Two further solid polymer electrolyte coatings 103 can be coated onto two outer cathode material coatings 104, thereby respectively functioning as the upper outer surface and the lower outer surface of the battery cell sub-assembly.

Referring now to FIG. 2, a method 200 is depicted for forming a coating on an electrode structure via a slurry-based coating process.

At 202, a slurry can be obtained including one or more of the solid ionically conductive polymer material and an active material. The active material can be a cathode active material or an anode active material. The relative amounts of the solid ionically conductive polymer material and/or the active material in the slurry can be varied according to specific need and/or objective without departing from the scope of this disclosure. In some examples, the slurry can be in a liquid form.

At 204, the slurry can be coated onto an electrode structure. In some examples, the electrode structure can include the anode current collector (e.g., 101), the cathode current collector (e.g., 105), a previously deposited anode material coating (e.g., 102), a previously deposited cathode material coating (e.g., 104), or a previously deposited electrolyte coating (e.g., the solid polymer electrolyte coating 103, the anode electrolyte transition coating, the cathode electrolyte transition coating, etc.) Numerous slurry-based coating processes can be utilized without departing from the scope of this disclosure, including, but not limited to, slot-die coating, roll-to-roll coating (e.g., gravure coating, screen printing, flexographic printing), doctor-blade casting, tape casting, spray (aerosol) coating, reverse comma coating, etc.

At 206, the coated electrode structure can be dried and, at 208, the coated electrode structure can be calendared. The method 200 can then end.

Optimization of parameters accessible via slurry-based coating processes for the application of solid-state electrolyte coatings (e.g., the solid polymer electrolyte coating 103) to hybrid electrode assemblies for the manufacture of solid-state battery cells provides opportunities for concomitant optimization of properties of such solid-state electrolyte coatings.

In one or more examples, a thickness of the solid polymer electrolyte coating (e.g., 103) that is accessible ranges from approximately 0.5 microns to 150 microns, with the ability to access such thickness on a continuous basis. By deploying techniques such as gravure or flexographic printing, a particular texture or distribution of a component/phase at the interface can be imparted thereby achieving localized functionality specific to one or multiple interfaces (e.g., lithium dendrite suppression, interfacial polarization mitigation).

The use of roll-to-roll coating methods for primary coatings of the battery cell facilitates the manufacturing of individual and composite battery cells and battery cell sub-assemblies possessing characteristics of the battery cell as a whole without having to incorporate specialized handling/processing routines to install a separator coating. As a result, a manufacturing workflow does not require interruption because of a need to interweave separator coatings between the electrode structures prior to stacking for the realization of multi-electrode assembly stacks. FIGS. 1A-1C provide examples of such configurations where battery cell sub-assemblies of a multi-electrode battery cell are shown which can be assembled with increase ease due to increased stiffness and reduced process complexity (exemplary assembly processes are further described with reference to FIGS. 3-6).

Figure 4:
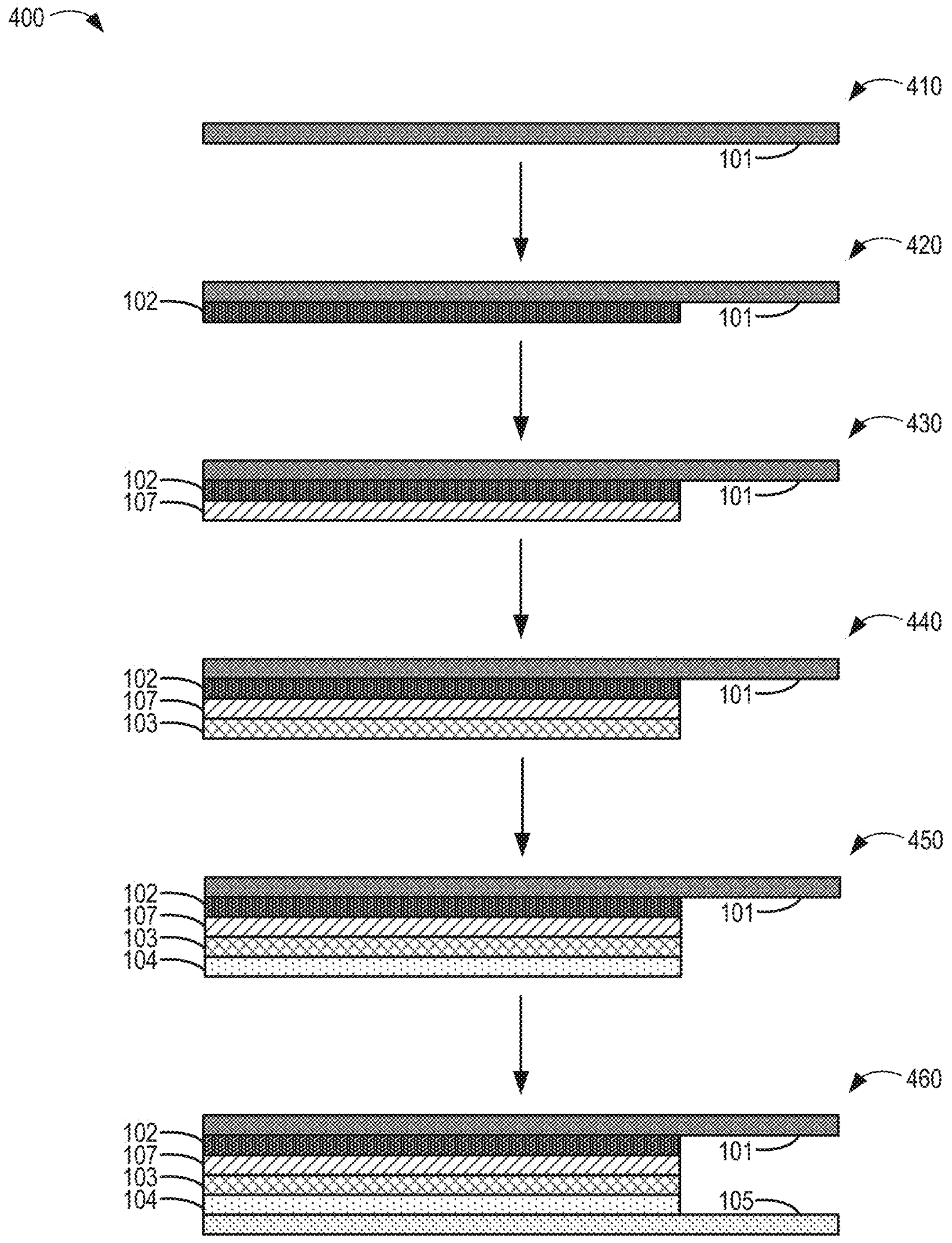
FIG. 4 shows a second schematic method for forming the battery cell sub-assembly.
Figure 5:
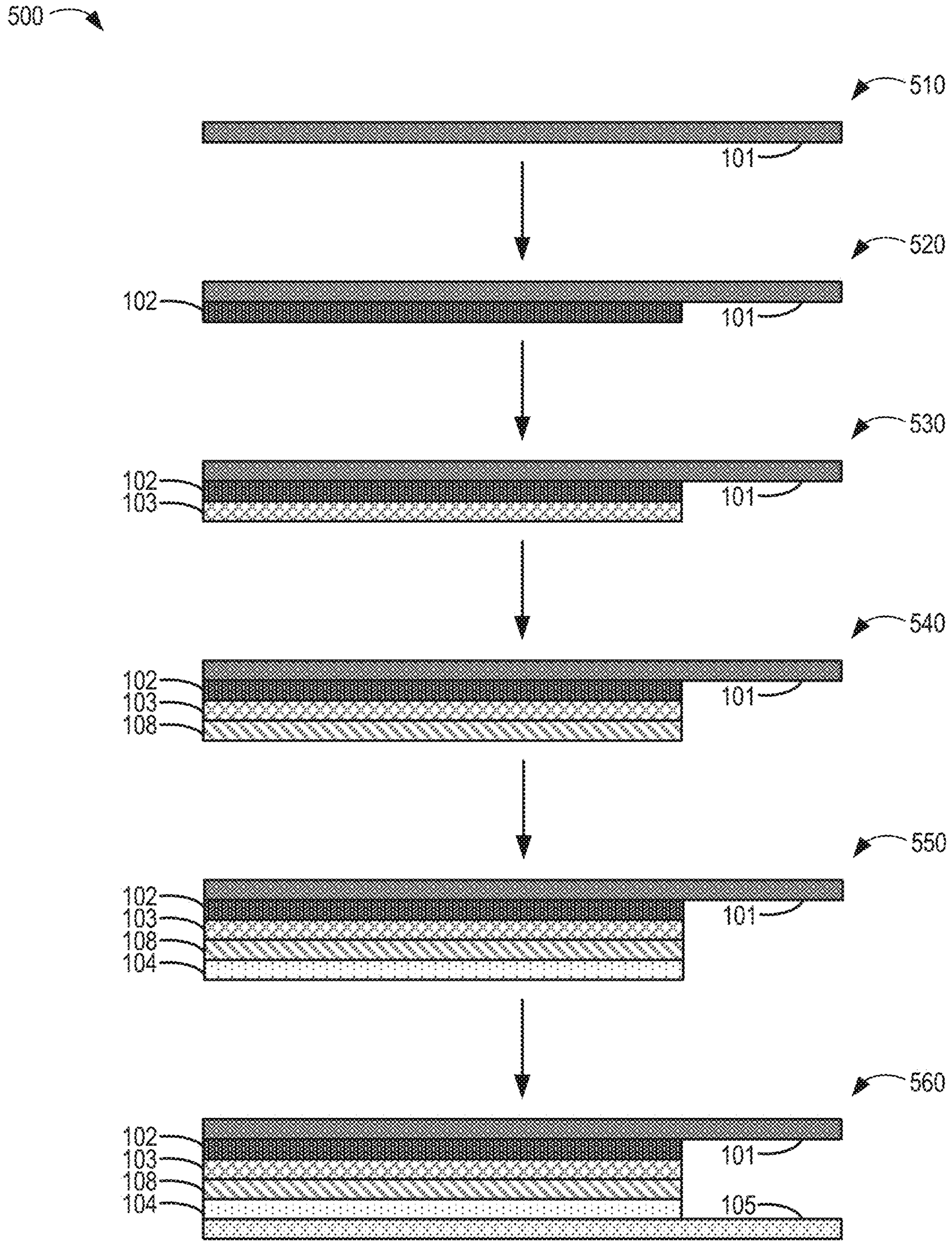
FIG. 5 shows a third schematic method for forming the battery cell sub-assembly.

In addition to co-depositing and completely coating the solid polymer electrolyte coating (e.g., 103) over the electrode structure(s) to facilitate manufacture of stiffer electrode assemblies and avoiding complex steps involving weaving of non-interlocking conventional battery separators into the electrode structure(s), slurry-based coating processes can provide an ability to vary deposition of the solid polymer electrolyte coating as well as interfacial modifier coatings (e.g., the cathode electrolyte transition coating and the anode electrolyte transition coating as described below with reference to FIGS. 4 and 5).

For example, roll-to-roll coating processes facilitate fabrication of a three-dimensional interface between electrode and electrolyte coatings thereby providing an opportunity to minimize an impedance of the three-dimensional interface due to increased surface area of the three-dimensional interface when compared to that provided by an analogous two-dimensional interface. Further the three-dimensional interface can be engineered by sequential deposition using techniques such as slot-die printing, aerosol spray deposition, or gravure or flexographic printing to realize each coating in a desired form. Examples of such sequential depositions are described below with reference to FIGS. 3-6.

In one or more examples, a given solid polymer electrolyte coating (e.g., the cathode electrolyte transition coating or the anode electrolyte transition coating) can be initially deposited on a surface of a given electrode structure, wherein the particle size distribution of the solid polymer electrolyte coating can be optimized to maximize interfacial contact with an adjacent surface of the electrode structure based on factors such as a porosity and roughness of said surface. Maximizing the interfacial contact between the solid polymer electrolyte coating and the adjacent surface of the electrode structure can reduce polarization losses in the battery cell. Changing the particle size distribution of the solid polymer electrolyte coating can further dictate an adjustment to a composition of the slurry in terms of selection of a binder vehicle, solvent content, and consequent fraction of the solid ionically conductive polymer material employed as the electrolyte. Such adjustments can be facilitated using the above-described methods of manufacturing. A slurry for coating a subsequent primary electrolyte coating (e.g., the solid polymer electrolyte coating 103) can thereafter have a different particle size distribution and equivalent binder vehicle and solvent to optimize bulk conductivity of the to-be-deposited coating to reduce an internal resistance of the battery cell.

By using a slurry-based interfacial coating including the solid ionically conductive polymer material to modify interfaces of the electrode structures of the battery cell, surface roughness and anomalous promontories which pose a serious threat to a structural integrity of the solid polymer electrolyte coating (e.g., 103) can be obviated.

In some examples, electrodes and electrolytes including the solid ionically conductive polymer material further can incorporate mechanical compliance therefrom. Such mechanical compliance can sustain percolation pathways during dynamic volume changes associated with the battery cells changing a state of charge.

Expanded strategies for reducing interfacial impedance include interface engineering though particle size, particle shape, and mixture concentration. The interfacial impedance can be further reduced relative to use of coatings incorporating the solid ionically conductive polymer material alone as slurry-coating processes allow for blending of interfaces, resulting in increased interfacial contact area between the solid polymer electrolyte coating (e.g., 103) and remaining electrode structures (the three-dimensional interface as opposed to the two-dimensional interface, as described hereinabove). Additionally, inter-particle impedance of the solid ionically conductive polymer material can be improved relative to ceramic counterparts due to a compressibility of the solid ionically conductive polymer material.

In some examples, improved gravimetric energy density relative to all-ceramic solid state approaches can be provided. Specifically, utilizing the solid ionically conductive polymer material can provide similarly high ionic conductivity and low flammability as inorganic solid-state electrolytes combined with lower density, thereby mitigating parasitic contributions to the gravimetric energy density of the battery cell originating from such higher density inorganic solid-state electrolytes, such as cases where e.g., LLZO ($Li_7La_3Zr_2O_{12}$), LAGP ($Li_{1.5}Al_{0.5}Ge_{1.5}(PO_4)_3$), LATP ($Li_{1.3}Al_{0.3}Ti_{1.7}(PO_4)_3$), are deployed as a medium for supporting percolative ionic conduction. The density of the solid ionically conductive polymer material described herein is less than 2.0 g/cm$^3$, in the range of 1.2 to 1.6 g/cm$^3$, and in an example greater than typical liquid electrolytes (about 1.4 g/cm$^3$), whereas the densities of the above-exemplified electrolytes are 5.2, 3.42, and 2.92 g/cm$^3$, respectively. Further, as a reference point, a density of an example liquid electrolyte, $LiPF_6$ EC:DMC (1:1) is 1.3634 g/mL. As such, replacing a conventional liquid electrolyte with a solid electrolyte can help preserve a gravimetric energy density of such conventional liquid electrolytes over the inorganic solid-state electrolytes described above.

In some examples, the slurry-based coating process described herein can yield reduced processing costs. Such reduced costs can result from elimination of steps involving filling, forming, venting, and resealing battery systems which rely on conventional liquid electrolytes.

The stiffness of each individual coating included in a given battery cell can contribute to the ease with which said battery cell can be assembled by way of stacking based on an accuracy and a precision with which individual electrodes, or coated hybrid electrodes, can be picked or selected, handled, and placed on top of one another without undue complexity or disruption from process failure. In a conventional electrode, composite stiffness arises from contributions of various components and interactions therebetween, the various components including the active material, a conductive additive, and a binder. For a fixed formulation, defined by components therein and relative fractions thereof, a maximum deflection of the electrode during handling, relative to a reference plane as defined by a given mechanical handling apparatus, can increase with increasing distance between pickup points, as well as with decreasing cell width. In addition, the deflection is proportional to the stiffness of the coated hybrid electrode overall. Lastly, as the deflection increases, so do difficulties associated with sequential stacking of the individual coatings of the battery cell, due to the deflection being associated with movement of the coatings relative to fixtures being used to pick or select, handle, and place the coatings. Reducing the deflection so as to stack the individual coatings to form the battery cell thus represents an area of technical importance as advanced automotive battery applications increasingly demand large area battery cells with high aspect ratio form factors (e.g., length/width>>1).

To mitigate deflection/sagging of the individual coatings during handling processes, three strategies which can lead to stiffening of the individual electrodes or electrode sub-assemblies (e.g., coated hybrid electrodes) can include: 1) increasing the stiffness of the individual coatings by adding a stiffening agent; 2) adding a stiffening coating on top of the manufactured electrode, which can be of greater stiffness than the electrode on which the stiffening coating is placed, thereby increasing the stiffness of the electrode by way of an increase in the thickness of the realized battery cell sub-assembly, as well as the stiffness/integrity of at least some component coatings; and 3) manufacturing the individual coatings in battery cell sub-assemblies to impart greater stiffness to each battery cell sub-assembly and thereby easing a stacking process by which the battery cell is built from a plurality of said battery cell sub-assemblies (as exemplified and described with reference to FIGS. 3-6).

Specific to the first strategy, the stiffening agent can include a powder including one or more of a solid polymer electrolyte (e.g., the solid ionically conductive polymer material), an inorganic solid electrolyte, and an inorganic oxide.

Specific to the second strategy, the stiffening coating applied to the electrode can include wholly, or in part, the stiffening agent to realize an increased thickness and stiffness over a given coating on to which the stiffening coating is deposited. Further, the stiffening coating can result in a greater thickness for the battery cell sub-assembly as a whole.

Specific to the third strategy, replacing a separator/liquid electrolyte assembly with the solid polymer electrolyte coating (e.g., 103) results in increased stiffness in the battery cell overall. Further, and as described below with reference to FIGS. 4-6, chemo-mechanically bonded interfaces (e.g., the cathode electrolyte transition coating and the anode electrolyte transition coating) with two opposing electrodes can result in the battery cell sub-assembly having increased stiffness by virtue of impeding slip between said electrodes.

To that end, FIGS. 3-6 depict example configurations realized via at the third strategy oriented towards increasing stiffness to facilitate stacking of electrodes for the manufacture of large-format battery cells. Therein, each battery cell sub-assembly can be composed of a number of electrode structures (e.g., the anode current collector 101, the cathode current collector 105, the anode material coating 102, the cathode material coating 104) separated by solid polymer electrolyte coatings (e.g., 103).

Each electrode structure can further include a component which comprises the solid ionically conductive polymer material. As an example, to minimize interfacial resistance, each face of opposing cathode and anode structures can receive a slurry-based coating including the solid ionically conductive polymer material. In the embodiments described herein, an electrolyte coating can be composed of sub-coatings including the cathode electrolyte transition coating (as described below with reference to FIG. 5), a primary electrolyte coating (e.g., the solid polymer electrolyte coating 103), and the anode electrolyte transition coating (as described below with reference to FIG. 4). Specifically, the cathode electrolyte transition coating can be disposed between the solid polymer electrolyte coating and the cathode material coating (e.g., 104), the anode electrolyte transition coating can be disposed between the solid polymer electrolyte coating and the anode material coating (e.g., 102), and all three electrolyte sub-coatings can be disposed between the cathode material coating and the anode material coating. A battery cell can be constructed to include various configurations of the cathode electrolyte transition coating and the anode electrolyte transition coating, as exemplified in FIGS. 4-6.

Figure 3:
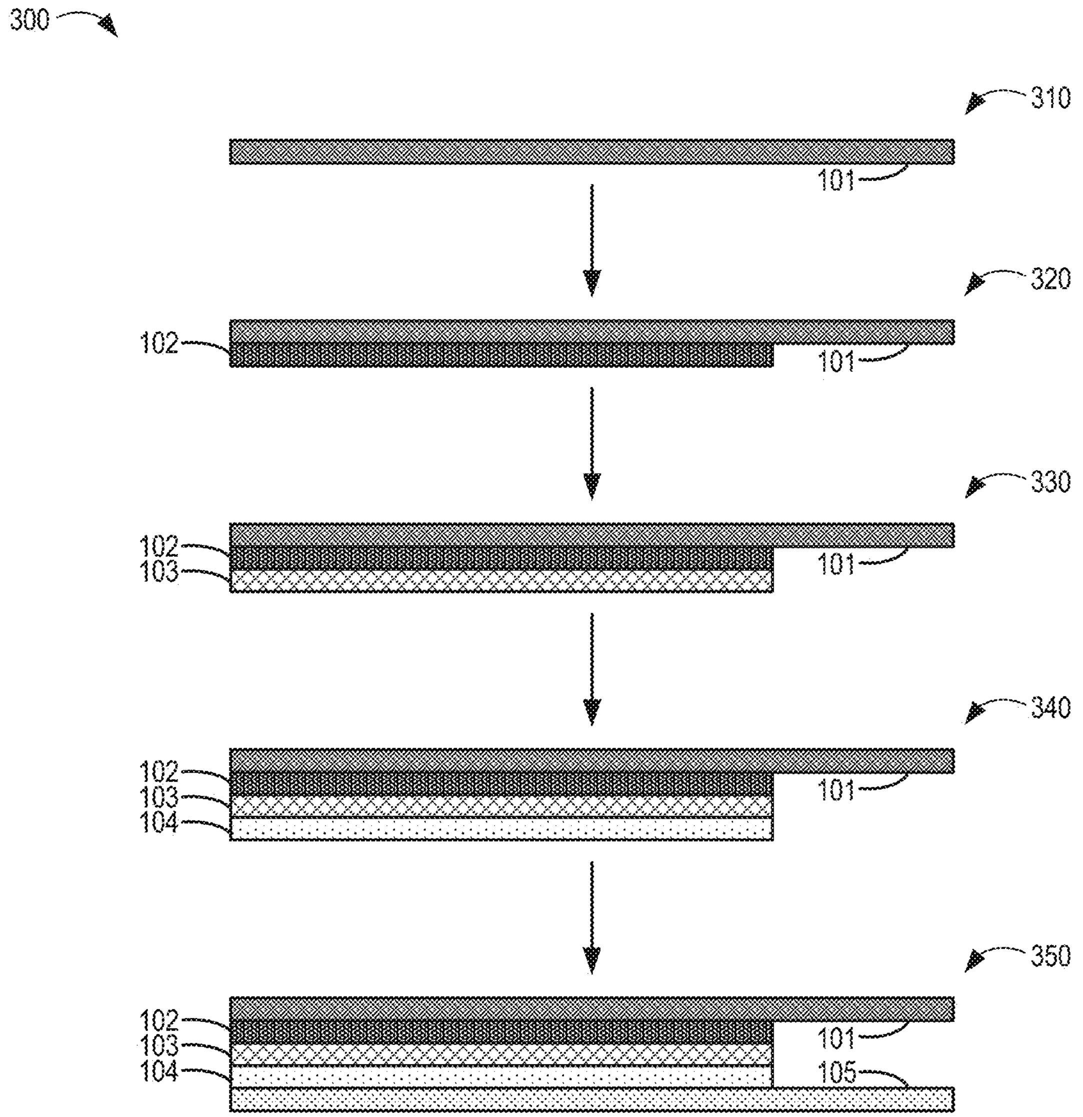
FIG. 3 shows a first schematic method for forming the battery cell sub-assembly.

Referring now to FIG. 3, a first schematic method 300 is depicted for forming a first example of a battery cell sub-assembly, or coated hybrid electrode, such as the battery cell sub-assembly described above with reference to FIGS. 1A-1C. Therein, each electrode, electrolyte, or electrode-electrolyte composite coating can be deposited utilizing a slurry-based coating method, such as the method described above with reference to FIG. 2. Specifically, current collectors, such as the anode current collector 101 and the cathode current collector 105, can be utilized as “backbones” to provide surfaces for coating of said coatings.

For example, schematic diagram 310 depicts the anode current collector 101. As shown in schematic diagram 320, the anode material coating 102 can be deposited onto the anode current collector 101. Further, as shown in schematic diagrams 330 and 340, the solid polymer electrolyte coating 103 and the cathode material coating 104 can then be respectively deposited. As such, the solid polymer electrolyte coating 103 can function as a separator coating between the anode material coating 102 and the cathode material coating 104. Further, as shown in schematic diagram 350, the cathode current collector 105 can then be stacked thereon to form the battery cell sub-assembly.

Referring now to FIG. 4, a second schematic method 400 is depicted for forming a second example of a battery cell sub-assembly, or coated hybrid electrode, such as the battery cell sub-assembly described above with reference to FIGS. 1A-1C. Therein, each electrode, electrolyte, or electrode-electrolyte composite coating can be deposited utilizing a slurry-based coating method, such as the method described above with reference to FIG. 2. Specifically, current collectors, such as the anode current collector 101 and the cathode current collector 105, can be utilized as "backbones" to provide surfaces for coating of said coatings.

For example, schematic diagram 410 depicts the anode current collector 101. As shown in schematic diagram 420, the anode material coating 102 can then be deposited onto the anode current collector 101. Further, as shown in schematic diagrams 430, 440, and 450, an anode electrolyte transition coating 107, the solid polymer electrolyte coating 103, and the cathode material coating 104 can then be respectively deposited. The anode electrolyte transition coating 107 can include the anode active material and the solid ionically conductive polymer material so as to reduce interfacial impedance between the anode material coating 102 and the solid polymer electrolyte coating 103. Further, as shown in schematic diagram 460, the cathode current collector 105 can then be stacked thereon to form the battery cell sub-assembly.

The anode electrolyte transition coating 107 can include a coating disposed between the anode material coating 102 and the solid polymer electrolyte coating 103, whereby a volume fraction of the anode active material can be less than that of the anode material coating 102 and a volume fraction of the solid ionically conductive polymer material can be less than that of the solid polymer electrolyte coating 103 and greater than that of the anode material coating 102.

In some examples, a thickness of the anode electrolyte transition coating 107 can be less than 20 microns, 10 microns, or 5 microns.

A total composite volume ($volume_{total}$) of the anode electrolyte transition coating 107 can be defined as $volume_{total}$=% $volume_{Component\ A}$+% $volume_{Component\ B}$+% $volume_{Component\ C}$+% $volume_{Component\ D}$, where % $volume_{Component\ A}$ corresponds to a percent volume of the anode active material, % $volume_{Component\ B}$ corresponds to a percent volume of the solid ionically conductive polymer material, % $volume_{Component\ C}$ corresponds to a percent free volume, and % $volume_{Component\ D}$ corresponds to a percent volume arising from a binder, one or more additives, and/or any other functional and non-functional components. In alternative examples, % $volume_{Component\ A}$ can be >30%, >40%, >45%, or >50%. In alternative examples, % $volume_{Component\ B}$ can be <50%, <40%, <35%, or <30%. In alternative examples % $volume_{Component\ C}$ can be <50%, <40%, <30%, <20%, <15%, <10%, or <5%. In some examples % $volume_{Component\ D}$ can be <20%, <15%, <10%, or <5%. In alternative examples, % $volume_{Component\ C}$+% $volume_{Component\ D}$ can be <30%, <20%, <15%, <10%, or <5%.

In alternative examples, a reversible specific gravimetric capacity of the anode active material included in the anode electrolyte transition coating 107 can be >150 mAh/g, >300 mAh/g, >600 mAh/g, or >1000 mAh/g.

In alternative examples, particles of the solid ionically conductive polymer material included in the anode electrolyte transition coating 107 can have an electrochemical stability window (z) vs. the $Li^{+/0}$ electrochemical redox couple of 0.0V≤z≤2 V, 0.25 V≤z≤2 V, or 0.5 V≤z≤2 V. Stability can be defined by a specific irreversible capacity at an electrochemical potential (e.g., z) of <50 mAh/g, <25 mAh/g, <10 mAh/g, or <5 mAh/g in alternative examples.

A particle distribution of the solid ionically conductive polymer material can be provided in the anode electrolyte transition coating 107 in such a manner as to provide a continuous percolation network, enabling solid-state ion transfer between basal planes of the anode material coating 102 and between particles of the anode active material.

The particle distribution of the solid ionically conductive polymer material can be distributed within the anode electrolyte transition coating 107 in such a manner as to enable ion transfer pathways with minimum tortuosity. In such a case, tortuosity (τ) can be defined by $\tau=L'/L$ where L' is the average ion transfer path length and L is the thickness of the anode electrolyte transition coating 107.

The particles of the ionically conductive solid-state polymer material included in the anode electrolyte transition coating 107 can have one or more of a spherical, ellipsoid, needle-like, and disk-like morphology.

The particles of the ionically conductive solid-state polymer material included in the anode electrolyte transition coating 107 can have high malleability, defined by a yield strength, such that particle-particle collisions between soft, low-density carbon- or silicon-based anode active material particles and additional soft polymer particles during dry or wet mixing coating formation processes can result in plastic deformation of the polymer particles.

Referring now to FIG. 5, a third schematic method 500 is depicted for forming a third example battery cell sub-assembly, or coated hybrid electrode, such as the battery cell sub-assembly described above with reference to FIGS. 1A-1C. Therein, each electrode, electrolyte, or electrode-electrolyte composite coating can be deposited utilizing a slurry-based coating method, such as the method described above with reference to FIG. 2. Specifically, current collectors, such as the anode current collector 101 and the cathode current collector 105, can be utilized as "backbones" to provide surfaces for coating of said coatings.

For example, schematic diagram 510 depicts the anode current collector 101. As shown in schematic diagram 520, the anode material coating 102 can then be deposited onto the anode current collector 101. Further, as shown in schematic diagrams 530, 540, and 550, the solid polymer electrolyte coating 103, a cathode electrolyte transition coating 108, and the cathode material coating 104 can then be respectively deposited. The cathode electrolyte transition coating 108 can include the cathode active material and the solid ionically conductive polymer material so as to reduce interfacial impedance between the solid polymer electrolyte coating 103 and the cathode material coating 104. Further, as shown in schematic diagram 560, the cathode current collector 105 can then be stacked thereon to form the battery cell sub-assembly.

The cathode electrolyte transition coating 108 can include a coating disposed between the cathode material coating 104 and the solid polymer electrolyte coating 103, whereby a volume fraction of the cathode active material can be less than that of the cathode material coating 104 and a volume fraction of the solid ionically conductive polymer material can be less than that of the solid polymer electrolyte coating 103 and greater than that of the cathode material coating 104.

In alternative examples, a thickness of the cathode electrolyte transition coating 108 can be less than 20 microns, 10 microns, or 5 microns.

A total composite volume ($volume_{total}$) of the cathode electrolyte transition coating 108 can be defined as $volume_{total}$=% $volume_{Component\ A}$+% $volume_{Component\ B}$+% $volume_{Component\ C}$+% $volume_{Component\ D}$, where % $volume_{Component\ A}$ corresponds to a percent volume of the cathode active material, % $volume_{Component\ B}$ corresponds to a percent volume of the solid ionically conductive polymer material, % $volume_{Component\ C}$ corresponds to a percent free volume, and % $volume_{Component\ D}$ corresponds to a percent volume arising from a binder, one or more additives, and/or any other functional and non-functional components. In alternative examples, % $volume_{Component\ A}$ can be >30%, >40%, >45%, or >50%. In alternative examples, % $volume_{Component\ B}$ can be <50%, <40%, <35%, or <30%. In alternative examples % $volume_{Component\ C}$ can be <30%, <20%, <15%, <10%, or <5%. In alternative examples % $volume_{Component\ D}$ can be <50%, <40%, <30%, <25%, <10%, or <5%. In alternative examples, % $volume_{Component\ C}$+% $volume_{Component\ D}$ can be <30%, <20%, <15%, <10%, or <5%.

In alternative examples, a reversible specific gravimetric capacity of the cathode active material included in the cathode electrolyte transition coating 108 can be >130 mAh/g, >150 mAh/g, >175 mAh/g, or >200 mAh/g.

In alternative examples, particles of the solid ionically conductive polymer material included in the cathode electrolyte transition coating 108 can have an electrochemical stability window (z) vs. the $Li^{+/0}$ electrochemical redox couple of 2 V≤z≤5 V, 2.5 V≤z≤5 V, or 2.5 V≤z≤5.5 V. Stability can be defined by a specific irreversible capacity at an electrochemical potential (e.g., z) of <50 mAh/g, <25 mAh/g, <10 mAh/g, or <5 mAh/g in alternative examples.

A particle distribution of the solid ionically conductive polymer material can be provided in the cathode electrolyte transition coating 108 in such a manner as to provide a continuous percolation network, enabling solid-state ion transfer between basal planes of the cathode electrolyte transition coating 108 and between particles of the cathode active material.

The particle distribution of the solid ionically conductive polymer material can be distributed within the cathode electrolyte transition coating 108 in such a manner as to enable ion transfer pathways with minimum tortuosity. In such a case, tortuosity (τ) can be defined by τ=L'/L where L' is the average ion transfer path length and L is the thickness of the cathode electrolyte transition coating 108.

The particles of the ionically conductive solid-state polymer material included in the cathode electrolyte transition coating 108 can have one or more of a spherical, ellipsoid, needle-like, and disk-like morphology.

The particles of the ionically conductive solid-state polymer material included in the cathode electrolyte transition coating 108 can have medium malleability, defined by the yield strength, such that particle-particle collisions between hard ceramic cathode active material particles and additional soft polymer particles during dry or wet mixing processes can result in plastic deformation of the polymer particles.

Figure 6:
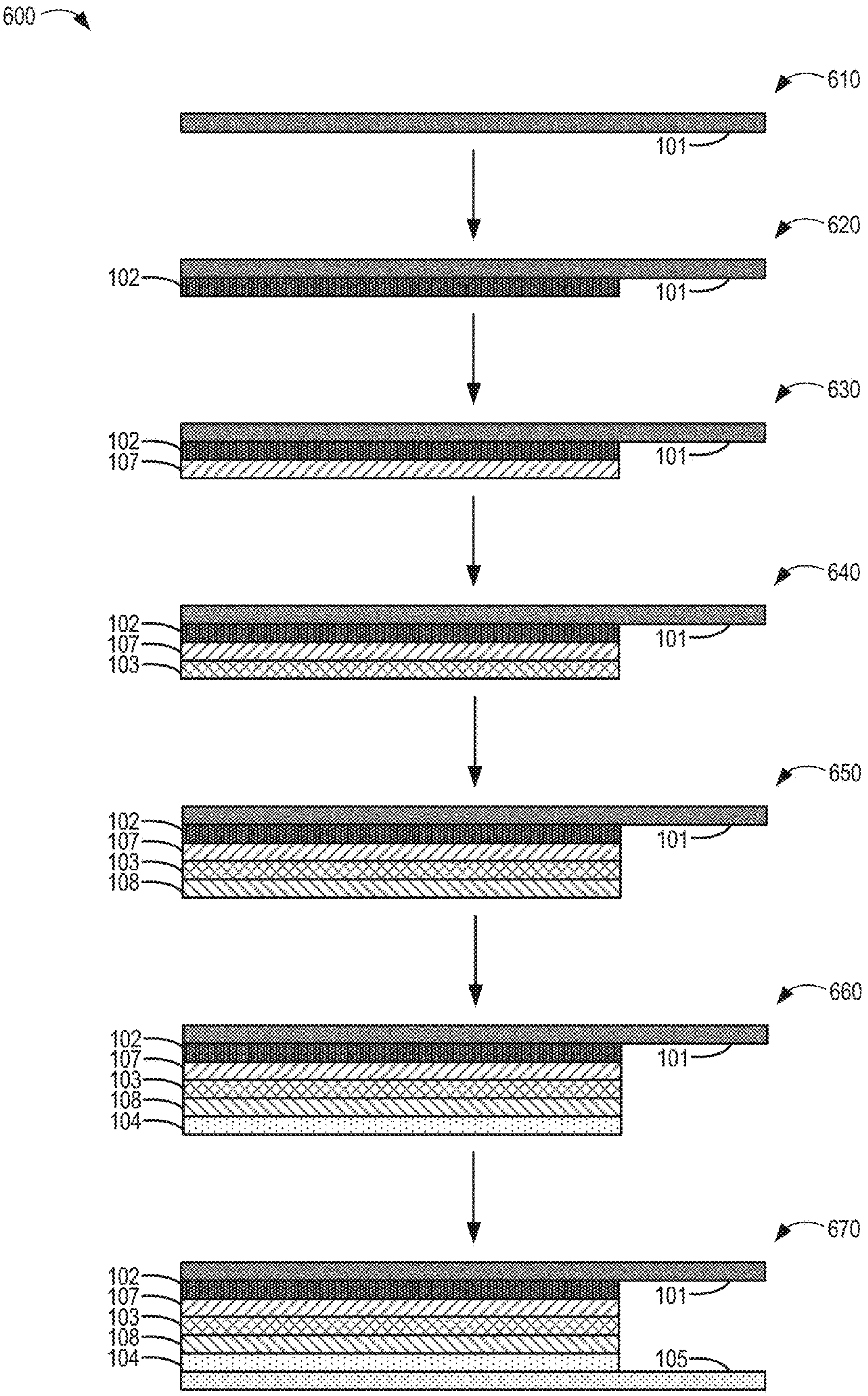
FIG. 6 shows a fourth schematic method for forming the battery cell sub-assembly.
Figure 7A:
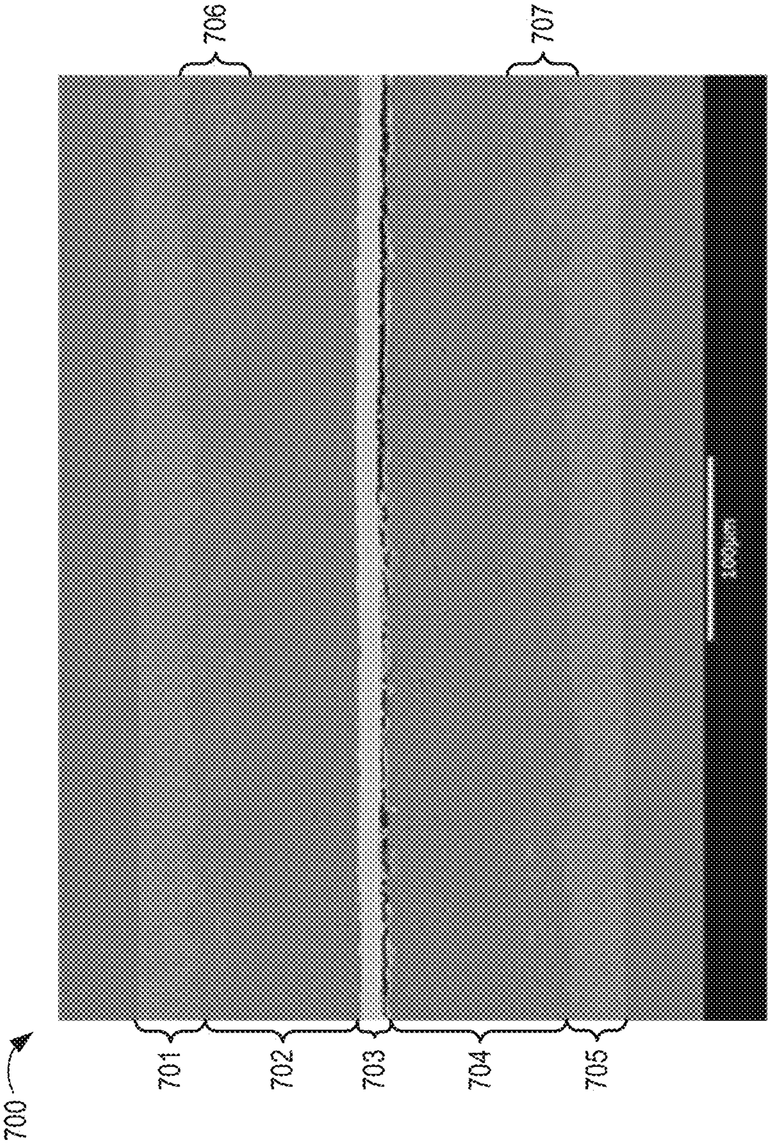
FIG. 7A shows a cross-section of an example electrode included in a double-coated structure.
Figure 7B:
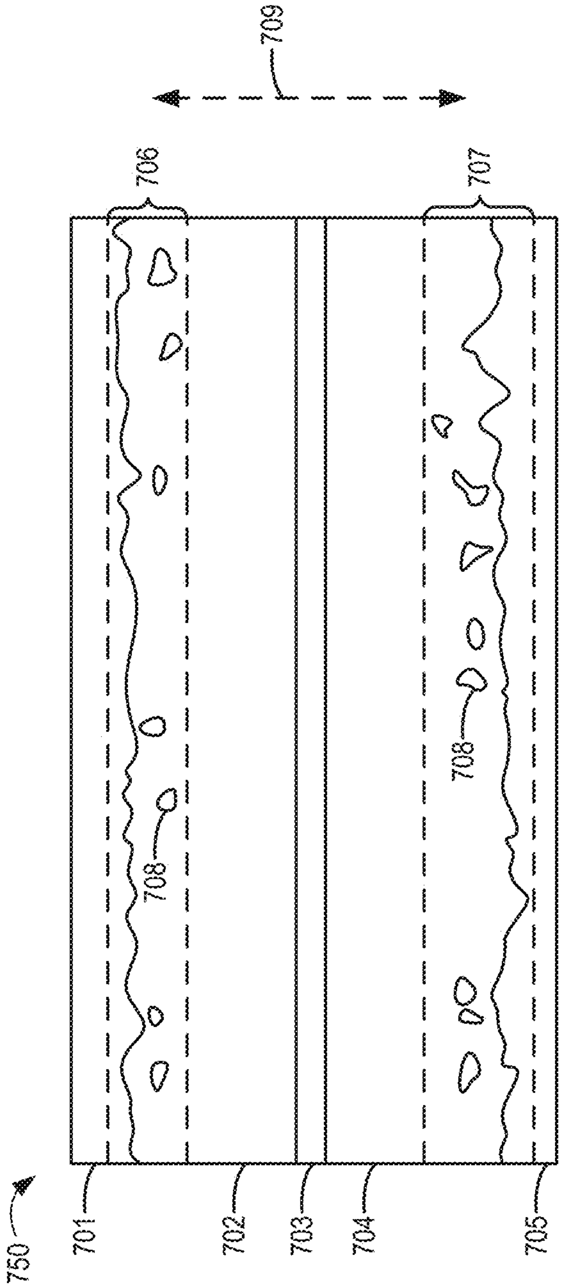
FIG. 7B shows a schematic cross section of the example electrode.

Referring now to FIG. 6, a fourth schematic method 600 is depicted for forming an fourth example battery cell sub-assembly, or coated hybrid electrode, such as the battery cell sub-assembly described above with reference to FIGS. 1A-1C. Therein, each electrode, electrolyte, or electrode-electrolyte composite coating can be deposited utilizing a slurry-based coating method, such as the method described above with reference to FIG. 2. Specifically, current collectors, such as the anode current collector 101 and the cathode current collector 105, can be utilized as "backbones" to provide surfaces for coating of said coatings.

For example, schematic diagram 610 depicts the anode current collector 101. As shown in schematic diagrams 620, 630, 640, 650, and 660, the anode material coating 102, the anode electrolyte transition coating 107, the solid polymer electrolyte coating 103, the cathode electrolyte transition coating 108, and the cathode material coating 104 can then be respectively deposited. Further, as shown in schematic diagram 670, the cathode current collector 105 can then be stacked thereon to form the battery cell sub-assembly.

Referring now to FIG. 7A, a cross-section 700 of an example electrode is depicted. The electrode can be a hybrid coated electrode included in a double-coated structure, wherein opposing sides of a current collector 703 are coated with one or more coatings. In the electrode depicted by cross-section 700, a sequential coating scheme can include a first slurry-based polymer separator coating 701 disposed on a first electrode material coating 702, which can be further disposed on the current collector 703. On an opposing side of the current collector 703, a second electrode material coating 704 can be disposed, with a second slurry-based polymer separator coating 705 further disposed on the second electrode material coating 704. Each of the first slurry-based polymer separator coating 701 and the second slurry-based polymer separator coating 705 can include the solid ionically conductive polymer material described hereinabove.

As shown in the cross-section 700, the electrode can further include a first adhesion interface 706 and a second adhesion interface 707. The first adhesion interface 706 can be a three-dimensional interface between the first slurry-based polymer separator coating 701 and the first electrode material coating 702, such that the first slurry-based polymer separator coating 701 can conform to, and permeate into, a surface of the first electrode material coating 702. Further, the second adhesion interface 707 can be a three-dimensional interface between the second slurry-based polymer separator coating 705 and the second electrode material coating 704, such that the second slurry-based polymer separator coating 705 can conform to, and permeate into, a surface of the second electrode material coating 704. Each of the first adhesion interface 706 and the second adhesion interface 707 can be characterized by an extent to which the solid ionically conductive polymer material permeates from the first slurry-based polymer separator coating 701 to the first electrode material coating 702 and from the second slurry-based polymer separator coating 705 to the second electrode material coating 704, respectively. The first adhesion interface 706 and the second adhesion interface are described in greater detail below with reference to FIG. 7B.

Using a slot-die technique, a slurry-based polymer separator can be coated onto a surface of one or both sides of an electrode structure (e.g., the current collector 703, the first electrode material coating 702, the second electrode material coating 704). In one example, the electrode structure includes an anode current collector coated on one or both sides by a coating containing an anode active material. A cross-section of a resultant electrode, such as the cross-section 700, can be prepared for microscopic image analysis by encasing a sample in epoxy to create a solid puck, followed by sectioning with a diamond saw blade. A final, polished surface can then be obtained by successive treatment with increasingly fine grit polishing pads. Cross-section 700 reveals continuous coatings of polymer separator (e.g., the first slurry-based polymer separator coating 701 and the second slurry-based polymer separator coating 705) which conform to a relatively rough surface of respective electrode substrate coatings (e.g., the first electrode material coating 702 and the second electrode material coating 704).

Adhesion interfaces between dried electrode and electrolyte coatings can be evaluated by measuring 180° peel strengths using, for example, an Instron® tensile testing apparatus. Briefly, a layer of adhesive tape can be attached to an exposed surface of a given electrolyte coating (e.g., the first slurry-based polymer separator coating 701, the second slurry-based polymer separator coating 705). A section of tape and base electrode can each be secured in, for example, an Instron® sample holder with a 180° orientation. The sample holder can then be drawn upward at a constant rate for 80 mm, recording a resistant force every 5 mm of peel length. An average resistant force corresponds to a minimum coating-to-coating adhesive strength present in the electrode-electrolyte-adhesive tape section. As an example, for anodes coated with slurry-based polymer separators, the 180° peel strength of one or more adhesion surfaces therein can be at least 200 gf/in, corresponding to the adhesion of the adhesive tape to the surface of the slurry-based polymer separator coating. As such, the slurry-based coating methods described herein can result in greater adhesion then application of standalone polymer electrolyte films (which can, in some examples, have an adhesion of about 2.1 gf/in). Separator cohesion is evaluated by an SDL Atlas CM-5 AATCC Crockmeter. First, a separator-coated sample can be immobilized on a stage. The slurry-based polymer separator coating thereon can then be interrogated by subjecting a pre-weighed Crocking cloth square to 200 rubs at 120 mm length at 24.5 cm/sec. Subsequently weighing the cloth square indicated an accumulated mass of <0.1 mg. That is, the separator cohesion can be characterized by a mass loss of less than 0.1 mg when subjected to a standardized Crock meter test protocol. Slurry-based coating methods can therefore improve inter-particle cohesion and thus form mechanically robust coatings with relatively high bulk cohesion via a multistage coating, drying, and calendaring process. As such, the slurry-based coating methods described herein can result in greater bulk cohesion than in standalone polymer electrolyte films.

Referring now to FIG. 7B, a schematic cross-section 750 of the example electrode of FIG. 7A is depicted. As such, the electrode includes a sequential stacking configuration of the first slurry-based polymer separator coating 701, the first electrode material coating 702, the current collector 703, the second electrode material coating 704, and the second slurry-based polymer separator coating 705. Further, the first adhesion interface 706 can be the three-dimensional interface between the first slurry-based polymer separator coating 701 and the first electrode coating 702, and the second adhesion interface 707 can be the three-dimensional interface between the second slurry-based polymer separator coating 705 and the second electrode coating 704.

In some examples, each of the first slurry-based polymer separator coating 701 and the second slurry-based polymer separator coating 705 can be the solid polymer electrolyte coating 103 described above with reference to FIGS. 1A-1C and 3-6. In some examples, each of the first electrode coating 702 and the second electrode coating 704 can be the anode material coating 102 described above with reference to FIGS. 1A-1C and 3-6. In other examples, each of the first electrode coating 702 and the second electrode coating 704 can be the cathode material coating 104 described above with reference to FIGS. 1A-1C and 3-6. In some examples, the current collector 703 can be the anode current collector 101 described above with reference to FIGS. 1A-1C and 3-6. In other examples, the current collector 703 can be the cathode current collector 105 described above with reference to FIGS. 1A-1C and 3-6.

The first adhesion interface 706 can extend from the first slurry-based polymer separator coating 701 and conform to the surface of the first electrode material 702. Similarly, the second adhesion interface 707 can extend from the second slurry-based polymer separator coating 705 and conform to the surface of the second electrode material 704. As such, each of the first adhesion interface 706 and the second adhesion interface 707 can permeate into pores 708 near the respective surfaces of the first electrode material coating 702 and the second electrode material coating 704. As such, each of the first adhesion interface 706 and the second adhesion interface 707 can have a permeation length into the respective surfaces of the first electrode material coating 702 and the second electrode material coating 704. Further, a permeation length fraction can be defined for a given adhesion interface as the permeation length of the adhesion interface divided by a total length of a corresponding electrode material coating, wherein each of the permeation length and the total length can be parallel to an axis 709. In one example, the permeation length refers to a maximum extent of the adhesion interface into the corresponding electrode material coating. Further, in one example, the total length of the electrode material coating can refer to a maximum thickness of the electrode material coating along the axis 709. In some examples, each of the first adhesion interface 706 and the second adhesion interface 707 can respectively extend into the first electrode coating 702 and the second electrode coating 704 by a permeation length fraction of <50%, <40%, <30%, <25%, <20%, <15%, <10%, or <5% in alternative examples.

A number of benefits can be realized by using a slurry-based coating process to create a powder-based solid polymer electrolyte containing separator. Conventional large format battery cell technology relies on roll-to-roll processes to enable high volume and low cost routes to manufacture battery electrodes at industrial scales. The slurry-based separator coating methodology, such as that described herein, leverages approaches comparable to those used for the electrodes. By adopting systems and procedures required to make the electrodes, it is possible to eliminate complicated and costly infrastructure required to facilitate pick-and-place or interweaving approaches typically required for the installation of alternative separator technologies Consequently, large-format battery cells can be manufactured using spooled anodes, respectively coated on opposite sides with a slurry-based polymer separator. The spooled anodes can be stamped into individual electrodes using a roll-to-roll high-throughput process. A similar process can be carried out to form spooled double-sided cathodes. Anode-separator composite electrodes and cathode electrodes can then be grouped together by type into magazines and subsequently loaded into a stacking machine. Electrode stacking can be carried out by alternating cathode and anode-separator composite electrodes, while ensuring that adequate intra-group geometric alignment of anode and cathode current collector tabs is achieved. Each group of current collector tabs can then be respectively consolidated and fused to a tab lead using high energy ultrasonic welding. A resultant stack can then be placed into a pouch constructed of laminated aluminum, whereupon said stack can be heat-sealed on three of four sides. The fourth and final heat-seal on a remaining side can be conducted under vacuum to yield a final solid-state cell.

cancancancancancancanIn this way, a coated hybrid electrode can include a solid polymer electrolyte coating, the solid polymer electrolyte coating including a solid ionically conductive polymer material. The solid polymer electrolyte coating can function as a separator between a cathode material coating and an anode material coating, eliminating the need for a conventional battery separator. Further, the solid polymer electrolyte coating can be formed in a slurry-based coating process. The technical effect of utilizing such a slurry-based coating process is that the formed solid polymer electrolyte coating can be mechanically robust with uniform thickness. Further, a battery cell can be formed by first coating a subset of coatings to form a cell sub-assembly, whereby the cell sub-assemblies can then be stacked to form the battery cell. The technical effect of manufacturing the battery cell with such a stacking technique is that greater precision and accuracy of a coating process can be achieved as compared to sequentially depositing each coating of the battery cell individually. Further, a stiffness of the battery cell can be consequently increased.

In one example, a coated hybrid electrode, comprising an anode current collector; a cathode current collector; an anode material coating disposed on the anode current collector, the anode material coating comprising an anode active material; a cathode material coating disposed on the cathode current collector, the cathode material coating comprising a cathode active material; and a solid polymer electrolyte coating comprising a solid ionically conductive polymer material having an ionic conductivity greater than $1\times10^{-5}$ S/cm at room temperature and is in a glassy state at room temperature; wherein each of a first adhesion interface between the solid polymer electrolyte coating and the anode material coating and a second adhesion interface between the solid polymer electrolyte coating and the cathode material coating has a 180° peel strength of greater than 200 gf/in.

In another example, a battery cell, comprising a plurality of battery cell sub-assemblies, the battery cell sub-assemblies comprising an anode current collector having an anode material coating disposed thereon, the anode material coating comprising an anode active material; a cathode current collector having a cathode material coating disposed thereon, the cathode material coating comprising a cathode active material; and a solid polymer electrolyte coating in the form of a separator, the solid polymer electrolyte coating comprising a solid ionically conductive polymer material having an ionic conductivity greater than $1\times10^{-5}$ S/cm at room temperature and is in a glassy state at room temperature; wherein each of a first adhesion interface between the solid polymer electrolyte coating and the anode material coating and a second adhesion interface between the solid polymer electrolyte coating and the cathode material coating has a 180° peel strength of greater than 200 gf/in.

In yet another example, a method for forming a coating on an electrode structure, comprising forming a slurry comprising a solid ionically conductive polymer material wherein the solid ionically conductive polymer material has an ionic conductivity greater than $1\times10^{-5}$ S/cm at room temperature and is in a glassy state at room temperature; coating the slurry onto the electrode structure; drying the coated electrode structure; and calendaring the coated electrode structure; wherein the electrode structure comprises one of an anode material coating deposited on an anode current collector and a cathode material coating deposited on a cathode current collector; and an adhesion interface between the coating and the electrode structure has a 180° peel strength of greater than 200 gf/in.

The following claims particularly point out certain combinations and sub-combinations regarded as novel and non-obvious. These claims can refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties can be claimed through amendment of the present claims or through presentation of new claims in this or a related application. Such claims, whether broader, narrower, equal, or different in scope to the original claims, also are regarded as included within the subject matter of the present disclosure.

Ionic conductivity can be measured using electrochemical impedance spectroscopy (EIS) measurements as described in Attachment D and known to those of ordinary skill in the art at the time of this invention. Glassy state measurements can be conducted according to glass transition temperature measurement techniques as described in Attachment E and known to those of ordinary skill in the art. Other measurement methods as known to those of ordinary skill in the art the time of the invention are provided in Attachment F.

The invention claimed is:

1. A coated hybrid electrode, comprising:

an anode current collector;

a cathode current collector;

an anode material coating disposed on the anode current collector, the anode material coating comprising an anode active material;

a cathode material coating disposed on the cathode current collector, the cathode material coating comprising a cathode active material; and a solid polymer electrolyte coating comprising a solid ionically conductive polymer material having a glassy state at room temperature and an ionic conductivity greater than $1\times10^{-5}$ S/cm at room temperature;

wherein each of a first adhesion interface between the solid polymer electrolyte coating and the anode material coating and a second adhesion interface between the solid polymer electrolyte coating and the cathode material coating has a 180° peel strength of greater than 200 gf/in, and wherein the first adhesion interface permeates and extends into pores of the anode material coating; and the second adhesion interface permeates and extends into pores of the cathode material coating.

2. The coated hybrid electrode of claim 1, wherein a thickness of the solid polymer electrolyte coating is less than 100 microns.

3. The coated hybrid electrode of claim 1, wherein the solid ionically conductive polymer material is greater than 20% of a total composite volume of the solid polymer electrolyte coating.

4. The coated hybrid electrode of claim 1, wherein less than 80% of a total composite volume of the solid polymer electrolyte coating includes one or more of free volume, a binder, and one or more additives.

5. The coated hybrid electrode of claim 1, wherein a thickness of the anode material coating is greater than 30 microns.

6. The coated hybrid electrode of claim 1, wherein the anode material coating further comprises the solid ionically conductive polymer material.

7. The coated hybrid electrode of claim 1, wherein the solid ionically conductive polymer material is less than 40% of a total composite volume of the anode material coating.

8. The coated hybrid electrode of claim 1, wherein less than 50% of a total composite volume of the anode material coating includes one or more of free volume, a binder, and one or more additives.

9. The coated hybrid electrode of claim 1, wherein a thickness of the cathode material coating is greater than 50 microns.

10. The coated hybrid electrode of claim 1, wherein the cathode material coating further comprises the solid ionically conductive polymer material.

11. The coated hybrid electrode of claim 1, wherein the solid ionically conductive polymer material is less than 20% of a total composite volume of the cathode material coating.

12. The coated hybrid electrode of claim 1, wherein less than 50% of a total composite volume of the cathode material coating includes one or more of free volume, a binder, and one or more additives.

13. The coated hybrid electrode of claim 1, further comprising: an anode electrolyte transition coating disposed between the anode material coating and the solid polymer electrolyte coating, the anode electrolyte transition coating comprising the anode active material and the solid ionically conductive polymer material.

14. The coated hybrid electrode of claim 13, wherein a thickness of the anode electrolyte transition coating is less than 20 microns.

15. The coated hybrid electrode of claim 13, wherein the anode active material is greater than 30% of a total composite volume of the anode electrolyte transition coating, and wherein the anode active material is greater than 55% of a total composite volume of the anode material coating.

16. The coated hybrid electrode of claim 13, wherein the solid ionically conductive polymer material is less than 50% of a total composite volume of the anode electrolyte transition coating.

17. The coated hybrid electrode of claim 13, wherein less than 50% of a total composite volume of the anode electrolyte transition coating includes one or more of free volume, a binder, and one or more additives.

18. The coated hybrid electrode of claim 1, further comprising: a cathode electrolyte transition coating disposed between the cathode material coating and the solid polymer electrolyte coating, the cathode electrolyte transition coating comprising the cathode active material and the solid ionically conductive polymer material.

19. The coated hybrid electrode of claim 18, wherein a thickness of the cathode electrolyte transition coating is less than 20 microns.

20. The coated hybrid electrode of claim 18, wherein the cathode active material is greater than 30% of a total composite volume of the cathode electrolyte transition coating, and wherein the cathode active material is greater than 55% of a total composite volume of the cathode material coating.

21. The coated hybrid electrode of claim 18, wherein the solid ionically conductive polymer material is less than 50% of a total composite volume of the cathode electrolyte transition coating.

22. The coated hybrid electrode of claim 18, wherein less than 50% of a total composite volume of the cathode electrolyte transition coating includes one or more of free volume, a binder, and one or more additives.

23. The coated hybrid electrode of claim 13, wherein a volume fraction of the solid ionically conductive polymer material in the anode electrolyte transition coating is greater than in the anode material coating.

24. The coated hybrid electrode of claim 18, wherein a volume fraction of the solid ionically conductive polymer material in the cathode electrolyte transition coating is greater than in the cathode material coating.

25. The coated hybrid electrode of claim 13, wherein a volume fraction of the solid ionically conductive polymer material in the anode electrolyte transition coating is less than in the solid polymer electrolyte coating.

26. The coated hybrid electrode of claim 18, wherein a volume fraction of the solid ionically conductive polymer material in the cathode electrolyte transition coating is less than in the solid polymer electrolyte coating.

27. The coated hybrid electrode of claim 1, wherein each of the anode current collector and the cathode current collector is respectively included in a double-coated structure.

28. The coated hybrid electrode of claim 1, wherein the first adhesion interface extends into the anode material coating by a permeation length fraction of less than 50%; and the second adhesion interface extends into the cathode material coating by a permeation length fraction of less than 50%.

29. The coated hybrid electrode of claim 1, wherein a reversible specific gravimetric capacity of the anode active material is greater than 150 mAh/g.

30. The coated hybrid electrode of claim 1, wherein a reversible specific gravimetric capacity of the cathode active material is greater than 130 mAh/g.

31. The coated hybrid electrode of claim 1, wherein a density of the solid ionically conductive polymer material is greater than 1.2 $g/cm^3$ and less than 1.6 $g/cm^3$.

32. The coated hybrid electrode of claim 1, wherein particles of the solid ionically conductive polymer material have one or more of spherical, ellipsoid, needle-like, and disk-like morphology.

33. A coated hybrid electrode, comprising:

an anode current collector;

a cathode current collector;

an anode material coating disposed on the anode current collector, the anode material coating comprising an anode active material;

a cathode material coating disposed on the cathode current collector, the cathode material coating comprising a cathode active material;

a solid polymer electrolyte coating disposed between the anode material coating and the cathode material coating wherein the solid polymer electrolyte coating comprises a solid ionically conductive polymer material having a glassy state at room temperature and an ionic conductivity greater than $1\times10^{-5}$ S/cm at room temperature; and a battery separator layer bifurcating the solid polymer electrolyte coating;

wherein each of a first adhesion interface between the solid polymer electrolyte coating and the anode material coating and a second adhesion interface between the solid polymer electrolyte coating and the cathode material coating has a 180° peel strength of greater than 200 gf/in, and wherein the first adhesion interface permeates and extends into pores of the anode material coating; and the second adhesion interface permeates and extends into pores of the cathode material coating.

34. A coated hybrid electrode, comprising:

an anode current collector;

a cathode current collector;

an anode material coating disposed on a first side of the anode current collector and on a second side of the anode current collector, the anode material coating comprising an anode active material;

a cathode material coating disposed on a first side the cathode current collector and on a second side of the cathode current collector, the cathode material coating comprising a cathode active material; and a solid polymer electrolyte coating comprising a solid ionically conductive polymer material having a glassy state at room temperature and an ionic conductivity greater than $1\times10^{-5}$ S/cm at room temperature, wherein the solid polymer electrolyte coating is positioned between the anode current collector and the cathode current collector, and wherein the solid polymer electrolyte coating forms an upper outer surface and a lower outer surface of the coated hybrid electrode, and wherein a first adhesion interface between the solid polymer electrolyte coating and the anode material coating permeates and extends into pores of the anode material coating; and a second adhesion interface between the solid polymer electrolyte coating and the cathode material coating permeates and extends into pores of the cathode material coating.

* * * * *